United States Patent
Oi et al.

(10) Patent No.: US 11,204,078 B2
(45) Date of Patent: Dec. 21, 2021

(54) VIBRATION DAMPING DEVICE

(71) Applicant: AISIN AW CO., LTD., Anjo (JP)

(72) Inventors: Yoichi Oi, Ama (JP); Takao Sakamoto, Anjo (JP); Kazuhiro Itou, Anjo (JP); Masahiko Kobayashi, Anjo (JP)

(73) Assignee: AISIN AW CO., LTD., Anjo (JP)

(*) Notice: Subject to any disclaimer, the term of this patent is extended or adjusted under 35 U.S.C. 154(b) by 0 days.

(21) Appl. No.: 16/620,582

(22) PCT Filed: Aug. 9, 2018

(86) PCT No.: PCT/JP2018/029883
§ 371 (c)(1),
(2) Date: Dec. 9, 2019

(87) PCT Pub. No.: WO2019/035407
PCT Pub. Date: Feb. 21, 2019

(65) Prior Publication Data
US 2020/0141469 A1    May 7, 2020

(30) Foreign Application Priority Data
Aug. 14, 2017  (JP) .............................. JP2017-156518

(51) Int. Cl.
*F16F 15/14*   (2006.01)
*F16H 45/02*   (2006.01)

(52) U.S. Cl.
CPC ............ *F16F 15/145* (2013.01); *F16H 45/02* (2013.01); *F16H 2045/0263* (2013.01)

(58) Field of Classification Search
CPC ................. F16F 15/145; F16F 15/1457; F16F 15/14571; F16F 15/14; F16F 15/1414; F16F 15/13128; F16H 2045/0263
See application file for complete search history.

(56) References Cited

U.S. PATENT DOCUMENTS

2016/0258521 A1   9/2016   Kawahara et al.
2018/0187745 A1   7/2018   Tomiyama et al.

FOREIGN PATENT DOCUMENTS

DE   10 2014 217 470 A1   3/2016
JP   2015-212568 A        11/2015
(Continued)

OTHER PUBLICATIONS

International Search Report of PCT/JP2018/029883 dated Sep. 18, 2018 [PCT/ISA/210].

*Primary Examiner* — Luis A Gonzalez
(74) *Attorney, Agent, or Firm* — Sughrue Mion, PLLC

(57) ABSTRACT

A vibration damping device includes a support member that rotates, together with a rotary element to which torque from an engine is transmitted, about a center of rotation of the rotary element, a restoring force generation member that is coupled to the support member to transmit torque to and receive torque from the support member and that is swingable along with rotation of the support member, and an inertial mass body that is coupled to the support member via the restoring force generation member and that swings about the center of rotation in conjunction with the restoring force generation member along with rotation of the support member. The support member is disposed between at least a part of the restoring force generation member and at least a part of the inertial mass body in an axial direction.

11 Claims, 10 Drawing Sheets

(56) References Cited

FOREIGN PATENT DOCUMENTS

| | | |
|---|---|---|
| JP | 2017-053467 A | 3/2017 |
| WO | 2017/010130 A1 | 1/2017 |
| WO | 2017/014184 A1 | 1/2017 |
| WO | 2017/057681 A1 | 4/2017 |

VIBRATION DAMPING DEVICE

CROSS REFERENCE TO RELATED APPLICATIONS

This application is a National Stage of International Application No. PCT/JP2018/029883, filed Aug. 9, 2018, claiming priority to Japanese Patent Application No. 2017-156518, filed Aug. 14, 2017.

TECHNICAL FIELD

Aspects of the present disclosure relates to a vibration damping device including a restoring force generation member that is swingable along with rotation of a support member and an inertial mass body that is coupled to the support member via the restoring force generation member and that swings in conjunction with the restoring force generation member along with rotation of the support member.

BACKGROUND ART

There is known a torque fluctuation reducing device that reduces torque fluctuations in a rotor to which torque from an engine is input (see, for example, Patent Document 1). The torque fluctuation reducing device includes a mass body, a centrifugal element, and a cam mechanism. The mass body is disposed in alignment with the rotor in the axial direction, and is rotatable relative to the rotor. The centrifugal element is radially movably disposed in a recess formed in the rotor so as to receive the centrifugal force generated by rotation of the rotor and the mass body. The cam mechanism includes a cam and a cam follower. The cam is provided on the centrifugal element or one of the rotor and the mass body. The cam follower is provided on one of the rotor and the mass body or the centrifugal element. In the torque fluctuation reducing device, the mass body includes a first inertia ring and a second inertia ring that are disposed to face each other with the rotor interposed therebetween. The first and second inertia rings are coupled to each other by a pin extending through the rotor in the axial direction, or by a coupling portion that couples outer peripheral ends of the first and second inertia rings. Plural of the centrifugal elements are provided at intervals in the circumferential direction between the first and second inertia rings. When a relative displacement is produced between the rotor and the mass body in a rotational direction, the cam mechanism converts the centrifugal force acting on the centrifugal element into a circumferential force in a direction in which the relative displacement is reduced. In this manner, the centrifugal force acting on the centrifugal element is utilized as a force for reducing torque fluctuations. Thus, it is possible to vary the characteristics of reducing torque fluctuations in accordance with the rotational speed of the rotor.

RELATED ART DOCUMENTS

Patent Documents

Patent Document 1: Japanese Patent Application Publication No. 2017-53467

SUMMARY OF THE DISCLOSURE

As described above, in the torque fluctuation reducing device disclosed in Patent Document 1, plural of the centrifugal elements are disposed between the first and second inertia rings of the mass body in the axial direction. The centrifugal elements slidingly contact the first and second inertia rings when moving in the radial direction along with rotation of the rotor. Therefore, the vibration damping performance of the torque fluctuation reducing device is affected by a sliding resistance (frictional force) generated between the centrifugal elements that move in the radial direction of the rotor and the first and second inertia rings that swing coaxially with the rotor. Further, a study and analysis by the inventors found that the sliding resistance between the centrifugal elements and the first and second inertia rings greatly affects the vibration damping performance, and leads to a reduction in vibration damping performance. Accordingly, with the related-art torque fluctuation reducing device described above, it is difficult to achieve a desired fluctuation damping effect.

Thus, it is an aspect of the present disclosure to further improve the vibration damping performance of a vibration damping device including a restoring force generation member that swings along with rotation of a support member and an inertial mass body that swings in conjunction with the restoring force generation member.

A vibration damping device according to the present disclosure includes: a support member that rotates, together with a rotary element to which torque from an engine is transmitted, about a center of rotation of the rotary element; a restoring force generation member that is coupled to the support member to transmit torque to and receive torque from the support member and that is swingable along with rotation of the support member; and an inertial mass body that is coupled to the support member via the restoring force generation member and that swings about the center of rotation in conjunction with the restoring force generation member along with rotation of the support member; wherein the support member is disposed between at least a part of the restoring force generation member and at least a part of the inertial mass body in an axial direction of the rotary element.

In the vibration damping device of the present disclosure, the support member that rotates together with the rotary element is disposed between at least a part of the restoring force generation member and at least a part of the inertial mass body in an axial direction of the rotary element. Accordingly, when the rotary element and the support member rotate, the restoring force generation member and the inertial mass body do not slidingly contact each other, so that the sliding resistance between the restoring force generation member and the inertial mass body does not affect the vibration damping performance of the vibration damping device. In the vibration damping device of the present disclosure, when the rotary element and the support member rotate, the restoring force generation member and the inertial mass body slidingly contact the support member. However, a study and analysis by the inventors found that the sliding resistance between the restoring force generation member and the support member and the sliding resistance between the inertial mass body and the support member do not greatly affect the vibration damping performance of the vibration damping device, compared to the sliding resistance between the restoring force generation member and the inertial mass body. Accordingly, by arranging the support member between at least a part of the restoring force generation member and at least a part of the inertial mass body in the axial direction, it is possible to further improve the vibration damping performance of the vibration damping device including the restoring force generation member that swings along with rotation of the support member, and the inertial mass body that swings in conjunction with the restoring force generation member.

DETAILED DESCRIPTION

Hereinafter, embodiments of various aspects of the present disclosure will be described with reference to the drawings.

Figure 1:
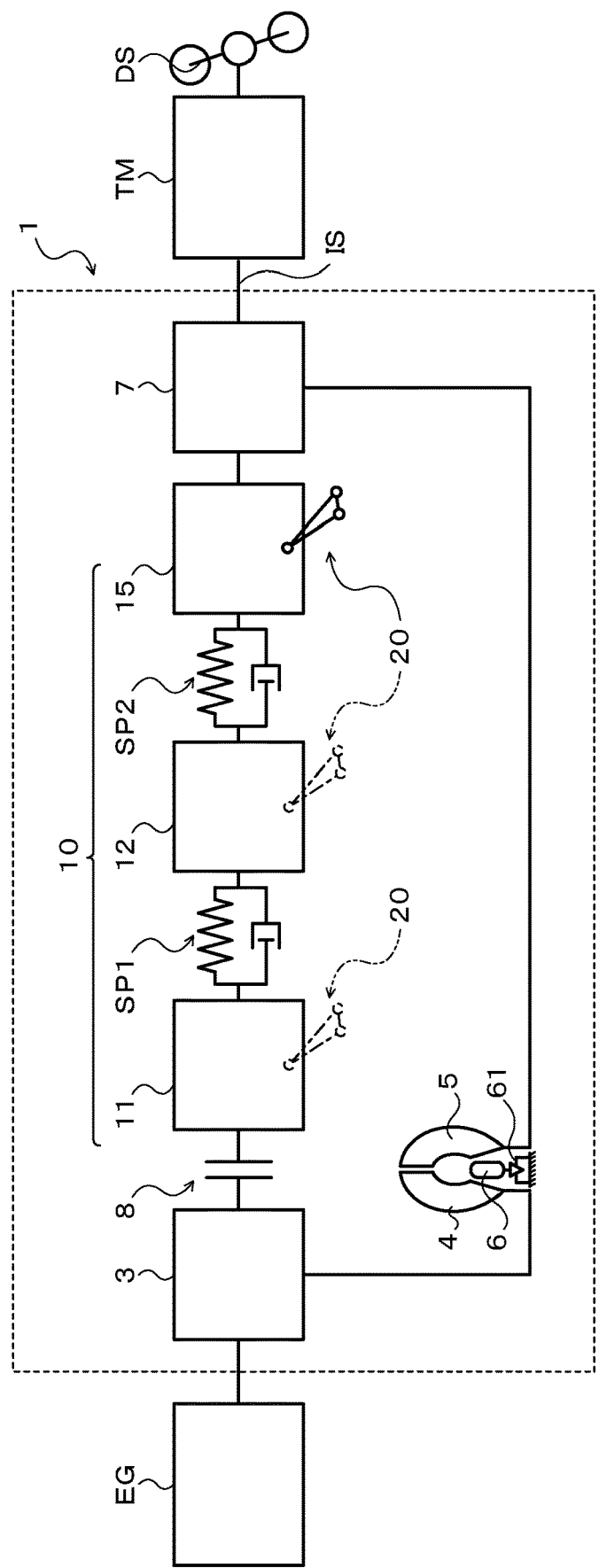
FIG. 1 is a schematic configuration diagram illustrating a starting device including a vibration damping device according to the present disclosure.

FIG. 1 is a schematic configuration diagram illustrating a starting device 1 including a vibration damping device 20 according to the present disclosure. The starting device 1 illustrated in FIG. 1 is mounted on a vehicle including an engine (internal combustion engine) EG serving as a drive device, and is configured to transmit power from the engine EG to a drive shaft DS of the vehicle. In addition to the vibration damping device 20, the starting device 1 includes: a front cover 3 serving as an input member coupled to a crankshaft of the engine EG; a pump impeller (input-side fluid transmission element) 4 fixed to the front cover 3 to rotate together with the front cover 3; a turbine runner (output-side fluid transmission element) 5 that is rotatable coaxially with the pump impeller 4; a damper hub 7 serving as an output member fixed to an input shaft IS of a transmission (power transmission device) TM, which is an automatic transmission (AT), a continuously variable transmission (CVT), a dual-clutch transmission (DCT), a hybrid transmission, or a reducer; a lock-up clutch 8; and a damper device 10.

In the following description, the "axial direction" basically refers to the direction in which the central axis (axis) of the starting device 1 or the damper device 10 (vibration damping device 20) extends, unless otherwise specified. The "radial direction" basically refers to the radial direction of the starting device 1, the damper device 10, or rotary elements of the damper device 10 and so on, that is, the extending direction of the line that extends from the central axis of the starting device 1 and the damper device 10 in a direction (direction of the radius) perpendicular to the central axis, unless otherwise specified. The "circumferential direction" basically refers to the circumferential direction of the starting device 1, the damper device 10, or the rotary elements of the damper device 10 and so on, that is, the direction along the rotational direction of the rotary elements, unless otherwise specified.

Figure 2:
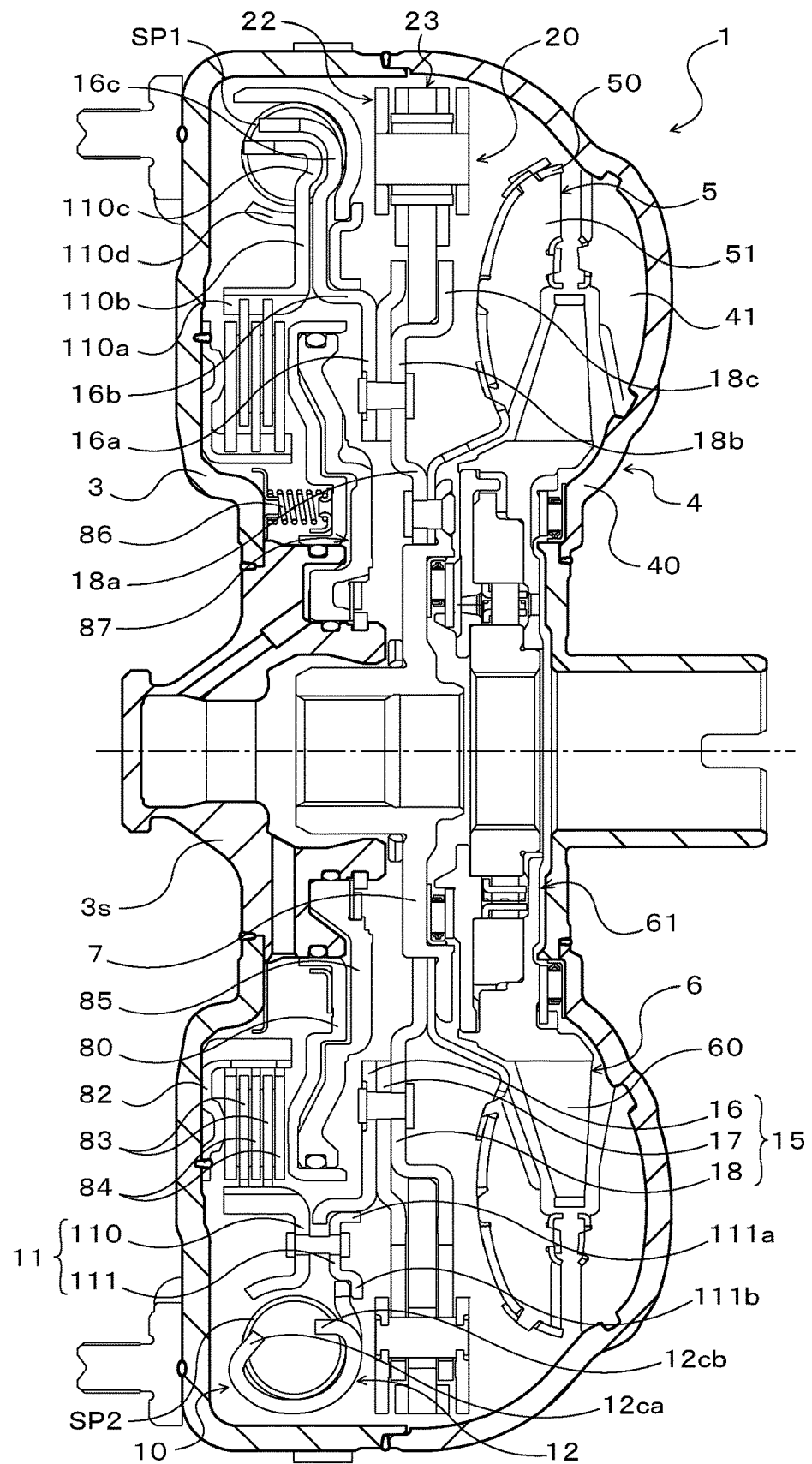
FIG. 2 is a cross-sectional view of the starting device of FIG. 1.

As illustrated in FIG. 2, the pump impeller 4 includes a pump shell 40 tightly fixed to the front cover 3, and a plurality of pump blades 41 disposed on the inner surface of the pump shell 40. As illustrated in FIG. 2, the turbine runner 5 includes a turbine shell 50, and a plurality of turbine blades 51 disposed on the inner surface of the turbine shell 50. The inner peripheral portion of the turbine shell 50 is fixed to the damper hub 7 via a plurality of rivets. The pump impeller 4 and the turbine runner 5 face each other, and a stator 6 that controls the flow of hydraulic oil (hydraulic fluid) from the turbine runner 5 to the pump impeller 4 is disposed coaxially therebetween. The stator 6 includes a plurality of stator blades 60. The rotational direction of the stator 6 is set to only one direction by a one-way clutch 61. The pump impeller 4, the turbine runner 5, and the stator 6 form a torus (annular flow path) in which hydraulic oil circulates, and serve as a torque converter (fluid transmission device) having a function to amplify torque. In the starting device 1, the stator 6 and the one-way clutch 61 may be omitted, and the pump impeller 4 and the turbine runner 5 may serve as a fluid coupling.

The lock-up clutch 8 is configured as a hydraulic multi-plate clutch. The lock-up clutch 8 establishes and releases lock-up in which the front cover 3 is coupled to the damper hub 7, that is, the input shaft IS of the transmission TM, via the damper device 10. The lock-up clutch 8 includes: a lock-up piston 80 supported by a center piece 3s, which is fixed to the front cover 3, so as to be movable in the axial direction; a clutch drum 110 included in a drive member 11 serving as an input element of the damper device 10; an annular clutch hub 82 fixed to the inner surface of the front cover 3 so as to face the lock-up piston 80; a plurality of first friction engagement plates (friction plates having a friction material on both surfaces) 83 fitted to splines formed on the clutch drum 110; and a plurality of second friction engagement plates (separator plates) 84 fitted to splines formed on the outer peripheral surface of the clutch hub 82.

The lock-up clutch 8 further includes: an annular flange member (oil chamber defining member) 85 attached to the center piece 3s of the front cover 3 so as to be positioned on the opposite side of the lock-up piston 80 from the front cover 3, that is, on the turbine runner 5 side with respect to the lock-up piston 80; and a plurality of return springs 86 disposed between the front cover 3 and the lock-up piston 80. As illustrated in FIG. 1, the lock-up piston 80 and the flange member 85 define an engagement oil chamber 87. Working oil (an engagement hydraulic pressure) is supplied to the engagement oil chamber 87 from a hydraulic control device (not illustrated). By increasing the engagement hydraulic pressure to the engagement oil chamber 87, the lock-up piston 80 is moved in the axial direction so as to press the first and second friction engagement plates 83 and 84 toward the front cover 3 and thus bring the lock-up clutch 8 into engagement (complete engagement or slip engagement). The lock-up clutch 8 may be configured as a hydraulic single-plate clutch.

As illustrated in FIGS. 1 and 2, the damper device 10 includes, as rotary elements, the drive member (input element) 11 including the clutch drum 110, an intermediate member (intermediate element) 12, and a driven member (output element) 15 fixed to the damper hub 7 via a plurality of rivets, together with the inner peripheral portion of the turbine shell 50. The damper device 10 further includes, as torque transmission elements, a plurality of (for example, three each in the present embodiment) first springs (first elastic bodies) SP1 and second springs (second elastic bodies) SP2 arranged alternately at intervals in the circumferential direction on the same circumference. The first and second springs SP1 and SP2 may be arc coil springs made of a metal material wound so as to have an axis that extends in an arc shape when no load is applied, or straight coil springs made of a metal material helically wound so as to have an axis that extends straight when no load is applied. Alternatively, the first and second springs SP1 and SP2 may be so-called double springs.

The drive member 11 of the damper device 10 includes the clutch drum 110 described above, and an annular drive plate 111 coupled to the clutch drum 110 via a plurality of rivets so as to rotate therewith. The clutch drum 110 includes a cylindrical drum portion 110a including splines to which a plurality of first friction engagement plates 83 are fitted, an annular coupling portion 110b extending radially outward from an end of the drum portion 110a, a plurality (for example, three at intervals of 120° in the present embodiment) spring abutment portions 110c provided at intervals (equal intervals) in the circumferential direction to extend radially outward from the coupling portion 110b and each having a claw extending in the axial direction, and a plurality of spring support portions 110d extending from the coupling portion 110b each disposed between the adjacent two of the spring abutment portions 110c in the circumferential direction and extending so as to be located on the radially outer side of the drum portion 110a. The drive plate 111 includes a short cylindrical inner peripheral portion 111a, and a support portion 111b offset from the outer peripheral portion of the drive plate 111 in the axial direction and extending radially outward. The drive plate 111 is fixed to the coupling portion 110b of the clutch drum 110 via a plurality of rivets so as to face the coupling portion 110b with a space therebetween in the axial direction.

The intermediate member 12 is configured as an annular member that surrounds the first and second springs SP1 and SP2 from the outer side, and is capable of supporting, together with the plurality of spring support portions 110d of the clutch drum 110 (drive member 11), the first and second springs SP1 and SP2 that are (alternately) adjacent on the same circumference. The intermediate member 12 includes a plurality of (for example, three at intervals of 120° in the present embodiment) spring abutment portions 12ca provided at intervals in the circumferential direction to extend radially outward from the outer peripheral portion, and a plurality of (for example, three at intervals of 120° in the present embodiment) spring abutment portions 12cb extending in the axial direction from the side portion. As illustrated in FIG. 2, the inner peripheral portion of the intermediate member 12 is rotatably supported by the outer peripheral surface of the drive plate 111, and is supported in the axial direction by the support portion 111b.

As illustrated in FIG. 2, the driven member 15 includes an annular first driven plate 16, an annular second driven plate 17, and an annular third driven plate 18 coupled to the first and second driven plates 16 and 17 via a plurality of rivets so as to rotate therewith and is fixed to the damper hub 7 via a plurality of rivets. As illustrated in FIG. 2, the second driven plate 17 is disposed closer to the front cover 3 than the first driven plate 16, and the third driven plate 18 is disposed closer to the turbine runner 5 than the second driven plate 17. In the present embodiment, the second and third driven plates 17 and 18 have the same thickness.

The first driven plate 16 includes an annular coupling portion 16a, a short cylindrical portion 16b extending in the axial direction from the outer periphery of the coupling portion 16a, and a plurality of (for example, three at intervals of 120° in the present embodiment) spring abutment portions 16c extending radially outward from the end of the cylindrical portion 16b and each having a claw extending in the axial direction The second driven plate 17 is an annular plate, and its outer peripheral portion is offset from its inner peripheral portion in the axial direction so as to be closer to the third driven plate 18. The third driven plate 18 includes an annular coupling portion 18a coupled to the second driven plate 17 and the damper hub 7, a short cylindrical portion 18b extending in the axial direction from the outer periphery of the coupling portion 18a so as to be away from the second driven plate 17, and an annular portion 18c extending radially outward from the end of the cylindrical portion 18b and facing the second driven plate 17 with a space therebetween in the axial direction. As illustrated in FIG. 2, the cylindrical portion 16b of the first driven plate 16 rotatably supports the drive plate 111 of the drive member 11. Thus, the drive member 11 and the intermediate member 12 supported by the drive plate 111 are aligned with the damper hub 7 by the driven member 15.

When the damper device 10 is in the attached state, the first and second springs SP1 and SP2 are supported by the spring support portions 110d of the drive member 11 and the intermediate member 12 so as to be arranged alternately in the circumferential direction of the damper device 10, and are each disposed between the adjacent spring abutment portions 110c of the drive member 11 (clutch drum 110). Thus, the first and second springs SP1 and SP2 are disposed in an outer peripheral region of a fluid chamber 9 so as to be located on the radially outer side of the lock-up clutch 8 (the lock-up piston 80 and the first and second friction engagement plates 83 and 84).

Each of the spring abutment portions 12ca of the intermediate member 12 is disposed between the first and second springs SP1 and SP2 that are disposed between the adjacent spring abutment portions 110c paired with each other (acting in series), and abuts against the end portions of the first and second springs SP1 and SP2. Similarly, each of the spring abutment portions 12cb of the intermediate member 12 is disposed between the first and second springs SP1 and SP2 that are disposed between the adjacent spring abutment portions 110c paired with each other (acting in series), and abuts against the end portions of the first and second springs SP1 and SP2. Thus, when the damper device 10 is in the attached state, a first end portion of each first spring SP1 abuts against the corresponding spring abutment portion 110c of the drive member 11, and a second end portion of each first spring SP1 abuts against the corresponding spring abutment portion 12ca and 12cb of the intermediate member 12. Also, when the damper device 10 is in the attached state, a first end portion of each second spring SP2 abuts against the corresponding spring abutment portion 12ca and 12cb of the intermediate member 12, and a second end portion of each second spring SP2 abuts against the corresponding spring abutment portion 110c of the drive member 11.

Further, the spring abutment portions 16c of the driven member 15 (first driven plate 16) are interposed between the clutch drum 110 (spring abutment portions 110c) and the drive plate 111. Similar to the spring abutment portions 110c of the drive member 11, when the damper device 10 is in the attached state, each of the spring abutment portions 16c is disposed between the first and second springs SP1 and SP2 not paired with each other (not acting in series), and abuts against the end portions of the first and second springs SP1 and SP2. Thus, when the damper device 10 is in the attached state, the first end portion of each first spring SP1 also abuts against the corresponding spring abutment portion 16c of the driven member 15, and the second end portion of each second spring SP2 abuts against the corresponding spring abutment portion 16c of the driven member 15. As a result, the driven member 15 is coupled to the drive member 11 via the plurality of first springs SP1, the intermediate member 12, and the plurality of second springs SP2, and the paired first and second springs SP1 and SP2 are coupled in series via the spring abutment portions 12ca and 12cb of the intermediate member 12 between the drive member 11 and the driven member 15. In the present embodiment, the distance between the axis of the starting device 1 and the damper device 10 and the axis of the first springs SP1 is equal to the distance between the axis of the starting device 1 and so on and the axis of the second springs SP2.

The damper device 10 according to the present embodiment further includes a first stopper that restricts relative rotation between the drive member 11 and the intermediate member 12 and deflection of the first springs SP1, and a second stopper that restricts relative rotation between the drive member 11 and the driven member 15. The first stopper is configured to restrict relative rotation between the drive member 11 and the intermediate member 12 when torque transmitted from the engine EG to the drive member 11 reaches torque (first threshold) T1 that is less than torque T2 (second threshold) corresponding to a maximum torsional angle of the damper device 10. The second stopper is configured to restrict relative rotation between the drive member 11 and the driven member 15 when torque transmitted to the drive member 11 reaches the torque T2 corresponding to the maximum torsional angle. Thus, the damper device 10 has damping characteristics in two stages. The first stopper may be configured to restrict relative rotation between the intermediate member 12 and the driven member 15 and deflection of the second springs SP2. Alternatively, the damper device 10 may include a stopper that restricts relative rotation between the drive member 11 and the intermediate member 12 and deflection of the first springs SP1, and a stopper that restricts relative rotation between the intermediate member 12 and the driven member 15 and deflection of the second springs SP2.

The vibration damping device 20 is coupled to the driven member 15 of the damper device 10, and disposed inside the fluid chamber 9 filled with working oil. As illustrated in FIGS. 2 to 6, the vibration damping device 20 includes the second and third driven plates 17 and 18 serving as a support member (support plates), a plurality of (for example, three in the present embodiment) weight bodies 22 each serving as a restoring force generation member coupled to the second and third driven plates 17 and 18 so as to transmit torque to and receive torque from the second and third driven plates 17 and 18, and one annular inertial mass body 23 coupled to the weight bodies 22.

Figure 3:
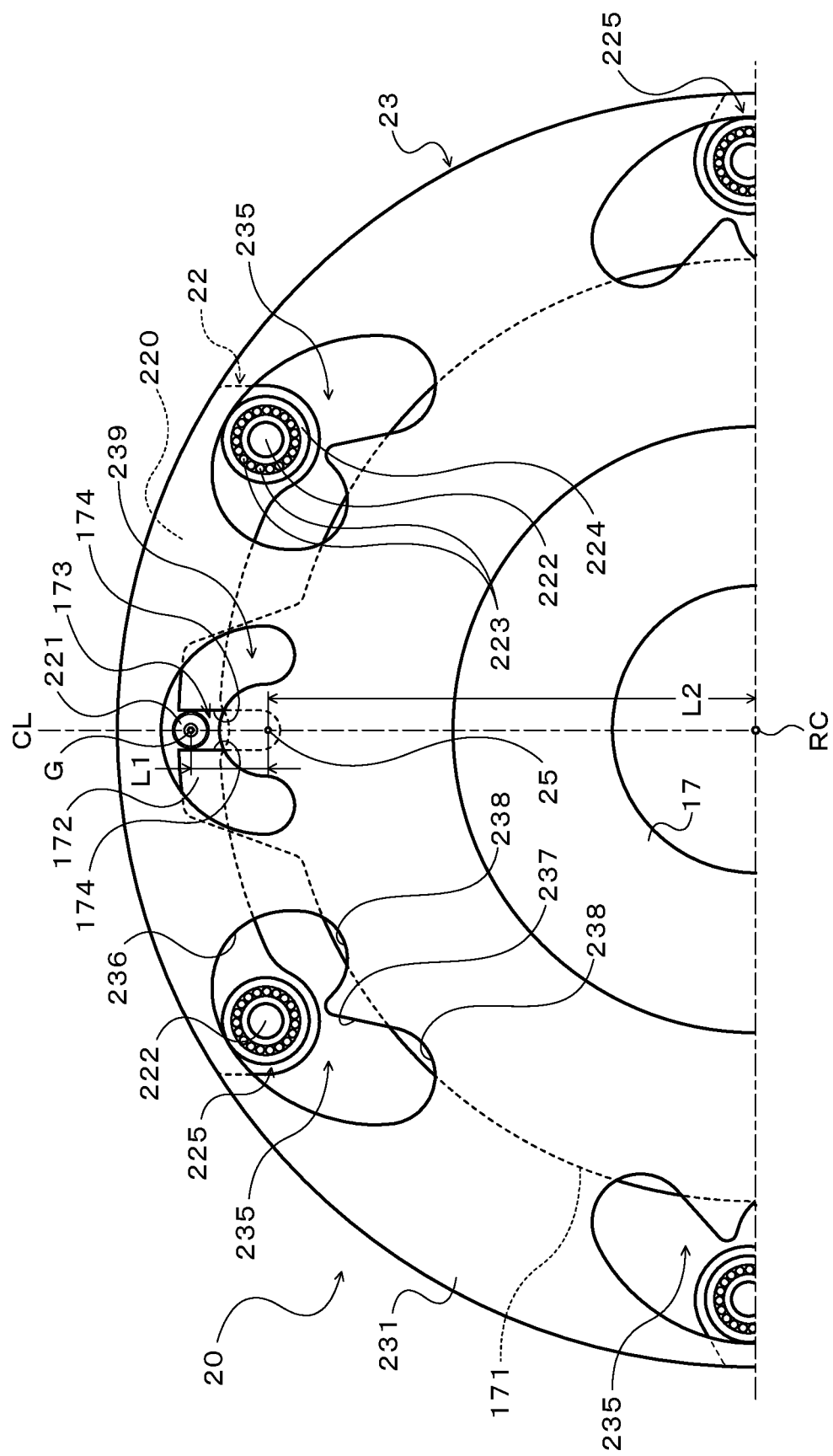
FIG. 3 is an enlarged view illustrating the vibration damping device according to the present disclosure.
Figure 4:
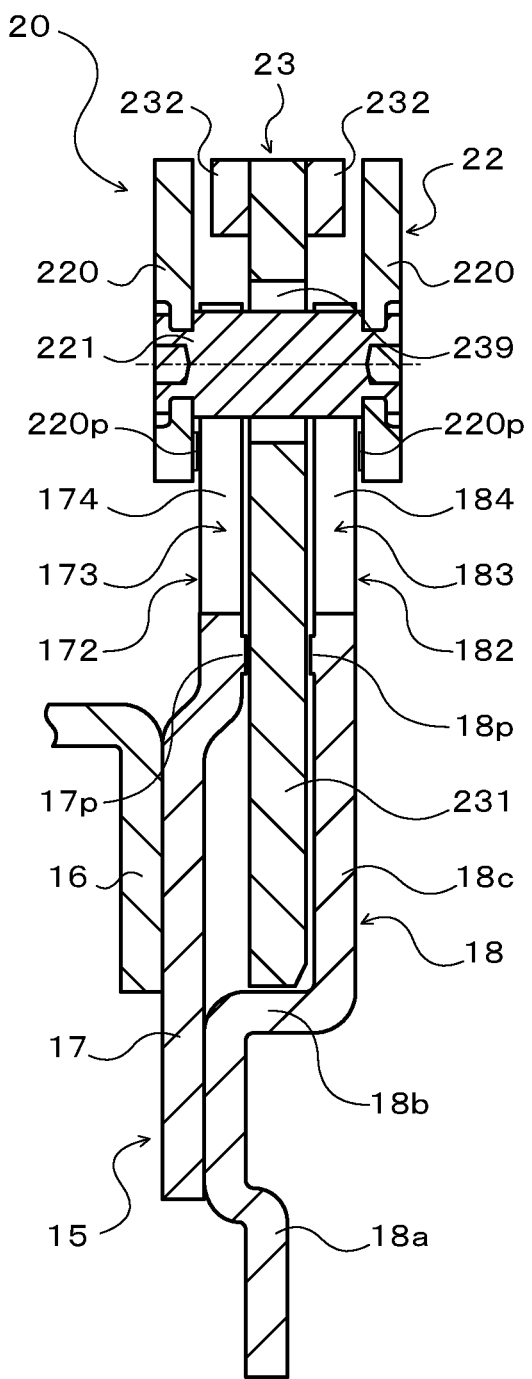
FIG. 4 is an enlarged cross-sectional view illustrating an essential portion of the vibration damping device according to the present disclosure.

As illustrated in FIGS. 3 and 4, the second driven plate 17 has a plurality of (for example, three in the present embodiment) projecting portions 172 formed at intervals (equal intervals) in the circumferential direction to project radially outward from an outer peripheral surface 171 thereof. Each projecting portion 172 has a slit (opening) 173 extending in the radial direction of the second driven plate 17. The slit 173 has a pair of flat inner surfaces 174 extending in the radial direction of the second driven plate 17 and facing each other with a space therebetween in the circumferential direction of the second driven plate 17. Each of the paired inner surfaces 174 serves as a torque transmission surface that transmits torque to and receives torque from the corresponding weight body 22. In the present embodiment, although the slit 173 is formed such that a radially outer end thereof is open as illustrated in FIG. 3, the slit 173 may be formed such that the radially outer end thereof is not open.

As illustrated in FIG. 4, the third driven plate 18 has a plurality of (for example, three in the present embodiment) projecting portions 182 formed at intervals (equal intervals) in the circumferential direction to project radially outward from its outer peripheral surface. Each projecting portion 182 has a slit (opening) 183 extending in the radial direction of the third driven plate 18. The slit 183 has a pair of flat inner surfaces 184 extending in the radial direction of the third driven plate 18 and facing each other with a space therebetween in the circumferential direction of the third driven plate 18. Each of the paired inner surfaces 184 also serves as a torque transmission surface that transmits torque to and receives torque from the corresponding weight body 22. In the present embodiment, although the slit 183 is also formed such that a radially outer end thereof is open, the slit 183 may be formed such that the radially outer end thereof is not open.

Figure 5:
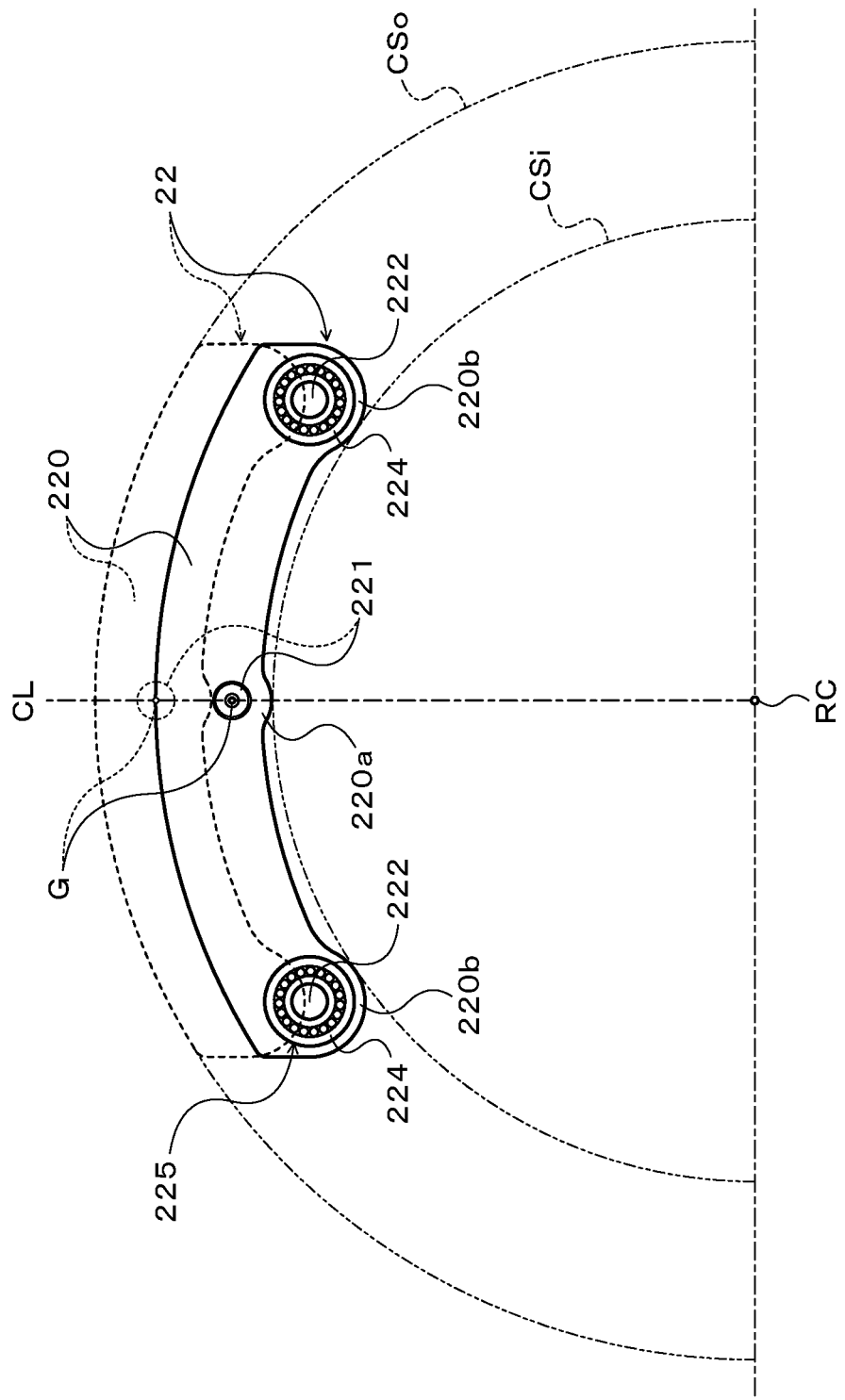
FIG. 5 illustrates a restoring force generation member included in the vibration damping device according to the present disclosure.

As illustrated in FIGS. 3 to 6, each weight body 22 includes two plate members (mass bodies) 220 having the same shape, one first coupling shaft 221, and two second coupling shafts 222. As illustrated in FIGS. 3 and 5, each of the plate members 220 is formed of a metal plate so as to have a symmetric arc planar shape, and the two plate members 220 are coupled to each other via the one first coupling shaft 221 and the two second coupling shafts 222 so as to face each other with a space therebetween in the axial direction of the second and third driven plates 17 and 18. As illustrated in FIG. 5, each plate member 220 includes an outer peripheral surface defined by a cylindrical surface CSo and an inwardly curved inner peripheral surface. The inner peripheral surface of each plate member 220 includes a projecting portion 220a disposed at the center in the width direction of the plate member 220, that is, in the vicinity of the first coupling shaft 221 and projecting in a direction away from the outer peripheral surface, and two projecting portions 220b disposed at a first end and a second end of the plate member 220 and projecting in the direction away from the outer peripheral surface. In the present embodiment, each of the projecting portions 220a and 220b has a cylindrical surface, and the surfaces of the projecting portions 220a and 220b contact a cylindrical surface CSi as illustrated in FIG. 5.

The first coupling shaft 221 is formed in the shape of a solid (or hollow) round rod. As illustrated in FIGS. 3 and 5, the first coupling shaft 221 is fixed (coupled) to the two plate members 220 such that its axis passes through a center of gravity G of the weight body 22 on a center line CL (line passing through a center of rotation RC of the second and third driven plates 17 and 18 when the weight body 22 is attached) of the weight body 22 (plate members 220) in the width direction (circumferential direction) thereof. The first coupling shaft 221 has an outside diameter less than the distance between the pair of inner surfaces 174 and between the pair of inner surfaces 184 (the width of the slits 173 and 183) of the second and third driven plates 17 and 18 and the radial length of the inner surfaces 174 and 184. The first coupling shaft 221 is slidably disposed in the slit 173 in the corresponding projecting portion 172 of the second driven plate 17 so as to abut against one of the paired inner surfaces 174, and is slidably disposed in the slit 183 in the corresponding projecting portion 182 of the third driven plate 18 so as to abut against one of the paired inner surfaces 184.

In this manner, each weight body 22 is coupled to the second and third driven plates 17 and 18 serving as a support member so as to be radially movable thereto, and forms a sliding pair with the second and third driven plates 17 and 18. Further, since the first coupling shaft 221 can abut against one of the inner surfaces 174 of the corresponding slit 173 and one of the inner surfaces 184 of the corresponding slit 183, the first coupling shaft 221 serves as a torque transmission portion that transmits torque to and receives torque from the second and third driven plates 17 and 18. The first coupling shaft 221 may be configured to rotatably support a cylindrical outer ring via a plurality of rollers or balls (rolling bodies), or may be configured to rotatably support an outer ring without the intervention of rolling bodies.

Figure 6:
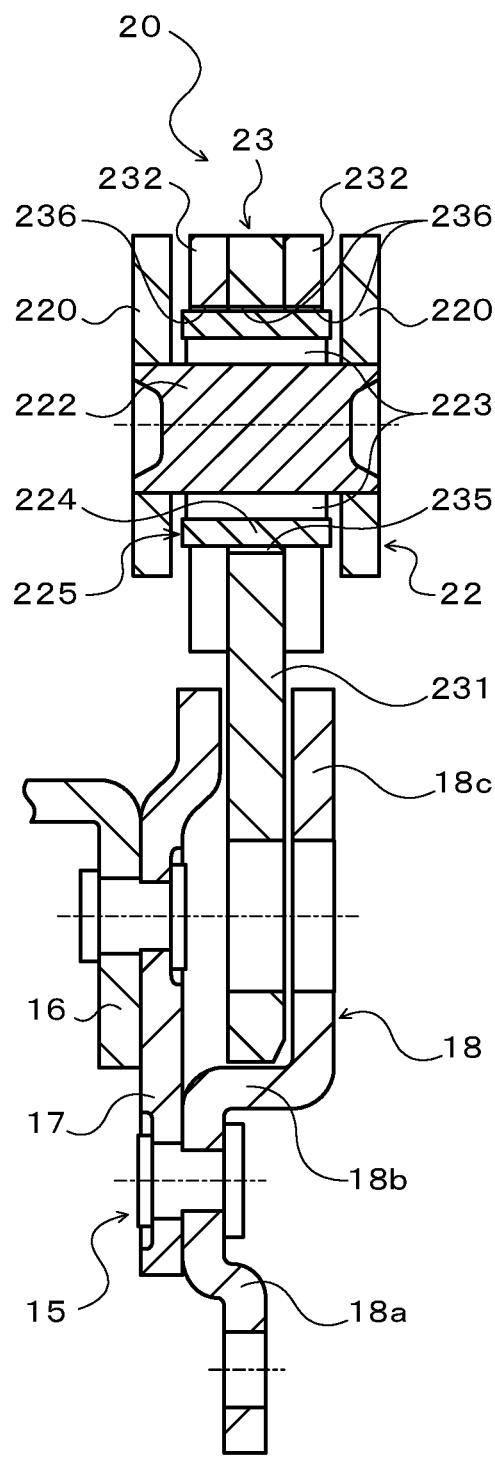
FIG. 6 is an enlarged cross-sectional view illustrating an essential portion of the vibration damping device according to the present disclosure.

Each of the two second coupling shafts of each weight body 22 is formed in the shape of a solid (or hollow) round rod. As illustrated in FIG. 3, the two second coupling shafts 222 are respectively fixed to the first end and the second end of each of the two plate members 220 so as to be located symmetrically with respect to the center line CL of the weight body 22 (plate members 220) passing through the center of gravity G That is, the axes of the two second coupling shafts 222 each fixed to the two plate members 220 are located symmetrically with respect to the center line CL of the weight body 22 in the width direction thereof. Further, as illustrated in FIGS. 3 and 6, each second coupling shaft 222 rotatably supports a cylindrical outer ring (roller) 224 via a plurality of rollers (rolling bodies) 223. The second coupling shaft 222, the plurality of rollers 223, and the outer ring 224 form a guided portion 225 of the weight body 22. In the present embodiment, since the projecting portion 220b are formed at the opposite ends of each plate member 220 as illustrated in FIG. 5, the outer periphery of each outer ring 224 does not extend outward beyond the peripheral edge of the plate member 220. Note that a plurality of balls may be disposed between the second coupling shaft 222 and the outer ring 224, in place of the plurality of rollers 223. Alternatively, rollers and balls may be omitted.

The inertial mass body 23 includes one annular first plate member 231 formed of a metal plate, and two annular second plate members 232 each formed of a metal plate. The weight of the inertial mass body 23 (first and second plate members 231 and 232) is determined to be sufficiently greater than the weight of each weight body 22. In the present embodiment, the radius of curvature of the outer peripheral surface of the first plate member 231 is equal to the radius of curvature of the outer peripheral surface of the second plate member 232. Further, as illustrated in FIGS. 4 and 6, the inner peripheral surface of each second plate member 232 is formed so as to be located on the radially outer side of the inner peripheral surface of the first plate member 231 when the second plate member 232 is disposed coaxially with the first plate member 231. Further, as illustrated in FIGS. 4 and 6, the thickness of each second plate member 232 is less than the thickness of the second and third driven plates 17 and 18 (projecting portions 172 and 182).

Further, as illustrated in FIGS. 3 and 6, the first plate member 231 includes a plurality of (for example, six in the present embodiment) guide portions 235 disposed in pairs at intervals in the circumferential direction. Each guide portion 235 is an opening extending in an arcuate shape, and guides the guided portion 225 of the corresponding weight body 22. In the present embodiment, two paired guide portions 235 are formed in the first plate member 231 so as to be symmetrical with respect to one of lines extending in the radial direction and dividing the first plate member 231 into three equal parts about the center (lines dividing the first plate member 231 into the same number of parts as the number of weight bodies 22).

As illustrated in FIG. 3, each guide portion 235 includes an inwardly curved guide surface 236 serving as a rolling surface for the outer ring 224 forming the guided portion 225 of the weight body 22, an outwardly curved support surface 237 facing the guide surface 236 from the inner peripheral side of the first plate member 231 and so on (the center side of the first plate member 231 and so on) with respect to the guide surface 236, and two stopper surfaces 238 continuous to the guide surface 236 and the support surface 237 on the opposite sides thereof. The guide surface 236 is formed such that when the outer ring 224 rolls on the guide surface 236 along with rotation of the second and third driven plates 17 and 18, the center of gravity G of the weight body 22 swings with respect to (moves toward and away from) the center of rotation RC of the second and third driven plates 17 and 18 in the radial direction, and swings about a virtual axis 25 that is set such that its relative position with respect to the inertial mass body 23 is unchanged, while maintaining an interaxial distance L1 to the virtual axis 25 constant. The virtual axis 25 is a line orthogonal to the first plate member 231 and so on and passing through a point that is located on one of lines extending in the radial direction and dividing the first plate member 231 and so on into three equal parts about the center (lines dividing the first plate member 231 and so on into the same number of equal parts as the number of weight bodies 22) and that is spaced apart from the center (center of rotation RC) of the first plate member 231 and so on by a predetermined interaxial distance L2. The support surface 237 is an outwardly curved surface formed to face the guide surface 236 with a distance slightly greater than the outside diameter of the outer ring 224 therebetween, and the stopper surface 238 is, for example, an inwardly curved surface extending in an arc shape. In the present embodiment, as illustrated in FIG. 6, plural of the guide surfaces 236 are formed at intervals in the circumferential direction such that guide surfaces 236 of the guide portions 235 of the first plate member 231 are continuous to the inner peripheral surfaces of the second plate members 232.

As illustrated in FIGS. 4 and 6, the second and third driven plates 17 and 18 serving as a support member are arranged in the axial direction between the two plate members 220 of the weight body 22. The second driven plate 17 and the annular portion 18c of the third driven plate 18 face each other with a space therebetween in the axial direction as described above, and the first plate member 231 of the inertial mass body 23 is disposed therebetween in the axial direction. Further, the inner peripheral surface of the first plate member 231 is rotatably supported by the outer peripheral surface of the cylindrical portion 18b of the third driven plate 18. Thus, the inertial mass body 23 is aligned with the damper hub 7 by the driven member 15, and hence is supported rotatably about the center of rotation RC by the second and third driven plates 17 and 18 to form a revolute pair with the second and third driven plates 17 and 18. Each second plate member 232 of the inertial mass body 23 is fixed to the surface of the first plate member 231 via a fixing member (not illustrated) so as to be disposed between the two plate members 220 of the weight body 22 in the axial direction and to be located on the radially outer side of a corresponding one of the second and third driven plates 17 and 18 (projecting portions 172 and 182).

As illustrated in FIGS. 4 and 6, the two plate members 220 of the weight body 22 are coupled to each other by the first and second coupling shafts 221 and 222 so as to hold the second and third driven plates 17 and 18 (projecting portions 172 and 182) and the inertial mass body 23 from the opposite sides in the axial direction. Further, as illustrated in FIGS. 3 and 4, the first plate member 231 of the inertial mass body 23 has an opening 239 extending in an arc shape, and the first coupling shaft 221 of the weight body 22 extends through the opening 239. In the present embodiment, the inner surface of the opening 239 is formed so as not to contact the first coupling shaft 221. As illustrated in FIG. 6, each second coupling shaft 222 coupling the two plate members 220 extends through the corresponding guide portion 235 of the inertial mass body 23 (first plate member 231), and each outer ring 224 contacts the guide surface 236 of the corresponding guide portion 235.

As described above, in the vibration damping device 20, each weight body 22 and the second and third driven plates 17 and 18 form a sliding pair, and the second and third driven plates 17 and 18 and the inertial mass body 23 form a revolute pair. Further, since the outer ring 224 of each weight body 22 can rotate on the guide surface 236 of the corresponding guide portion 235, each weight body 22 and the inertial mass body 23 form a sliding pair. Thus, the second and third driven plates 17 and 18, the plurality of weight bodies 22, and the inertial mass body 23 having guide portions 235 form a slider crank mechanism (double slider crank chain). Further, the vibration damping device 20 is in the equilibrium state when the center of gravity G of each weight body 22 is located on a line passing through the corresponding virtual axis 25 and the center of rotation RC (see FIG. 3).

Further, in the present embodiment, the plate members 220 of each weight body 22 and the inertial mass body 23 (first and second plate members 231 and 232) are offset in the axial direction of the second and third driven plates 17 and 18 serving as a support member, and each of the second and third driven plates 17 and 18 is disposed between a corresponding one of the plate members 220 of each weight body 22 and the inertial mass body 23 in the axial direction. That is, the second driven plate 17 (projecting portion 172) is disposed between one of the plate members 220 of each weight body 22 and the first plate member 231 of the inertial mass body 23 in the axial direction, and third driven plate 18 (projecting portion 182) is disposed between the other one of the plate members 220 of each weight body 22 and the first plate member 231 of the inertial mass body 23 in the axial direction. Each weight body 22 and the inertial mass body 23 (first and second plate members 231 and 232) overlap at least partially the first and second springs SP1 and SP2 of the damper device 10 as viewed in the axial direction (from the turbine runner 5 side).

As illustrated in FIG. 4, at least one projection (dowel) 220p is formed on each plate member 220 of the weight body 22. The projection 220p abuts against the surface of the projecting portion 172 of the second driven plate 17 or the surface of the projecting portion 182 of the third driven plate 18 to restrict movement of the plate member 220 with respect to the second driven plate 17 or the third driven plate 18 in the axial direction. Further, as illustrated in FIG. 4, a plurality of projections (dowels) 17p are formed at intervals in the circumferential direction on the second driven plate 17. The projections 17p abut against one surface of the first plate member 231 of the inertial mass body 23 to restrict movement of the inertial mass body 23 in the axial direction. Furthermore, as illustrated in FIG. 4, a plurality of projections (dowels) 18p are formed at intervals in the circumferential direction on the third driven plate 18. The projections 18p abut against the other surface of the first plate member 231 of the inertial mass body 23 to restrict movement of the inertial mass body 23 in the axial direction. However, projections that slidingly contact the plate members 220 of the weight body 22 may be formed on the second and third driven plates 17 and 18, and projections that slidingly contact the second or third driven plate 17 or 18 may be formed on the first plate member 231 of the inertial mass body 23.

The following describes the operation of the starting device 1 including the vibration damping device 20. In the starting device 1, when lock-up is released by the lock-up clutch 8, torque (power) from the engine EG serving as a drive member is transmitted to the input shaft IS of the transmission TM through a path extending through the front cover 3, the pump impeller 4, the turbine runner 5, and the damper hub 7 as is understood from FIG. 1. On the other hand, when lock-up is established by the lock-up clutch 8, torque (power) from the engine EG is transmitted to the input shaft IS of the transmission TM through a path extending through the front cover 3, the lock-up clutch 8, the drive member 11, the first springs SP1, the intermediate member 12, the second springs SP2, the driven member 15, and the damper hub 7 as is understood from FIG. 1.

When the drive member 11 coupled to the front cover 3 by the lock-up clutch 8 rotates along with rotation of the engine EG while lock-up is established by the lock-up clutch 8, the first and second springs SP1 and SP2 act in series with each other via the intermediate member 12 between the drive member 11 and the driven member 15 until torque transmitted to the drive member 11 reaches the torque T1. Thus, the torque transmitted from the engine EG to the front cover 3 is transmitted to the input shaft IS of the transmission TM, and fluctuations in the torque from the engine EG are damped (absorbed) by the first and second springs SP1 and SP2 of the damper device 10. When torque transmitted to the drive member 11 becomes equal to or greater than the torque T1, fluctuations in torque from the engine EG are damped (absorbed) by the first springs SP1 of the damper device 10 until the torque reaches the torque T2.

Further, in the starting device 1, when the damper device 10 coupled to the front cover 3 by the lock-up clutch 8 due to establishment of lock-up rotates together with the front cover 3, the second and third driven plates 17 and 18 (driven member 15) of the damper device 10 also rotate in the same direction as the front cover 3 about the axis of the starting device 1. When the second and third driven plates 17 and 18 rotate, the first coupling shaft 221 of each weight body 22 abuts against one of the paired inner surfaces 174 and one of the paired inner surfaces 184 of the corresponding slits 173 and 183 in accordance with the rotational direction of the second and third driven plates 17 and 18. Further, the outer ring 224 supported by each second coupling shaft 222 of the weight body 22 is pressed against the guide surface 236 of the corresponding guide portion 235 of the inertial mass body 23 due to the action of the centrifugal force on the weight body 22, and receives a force due to the moment of inertia (resistance to rotation) of the inertial mass body 23 to roll on the guide surface 236 toward one end of the guide portion 235.

Figure 7:
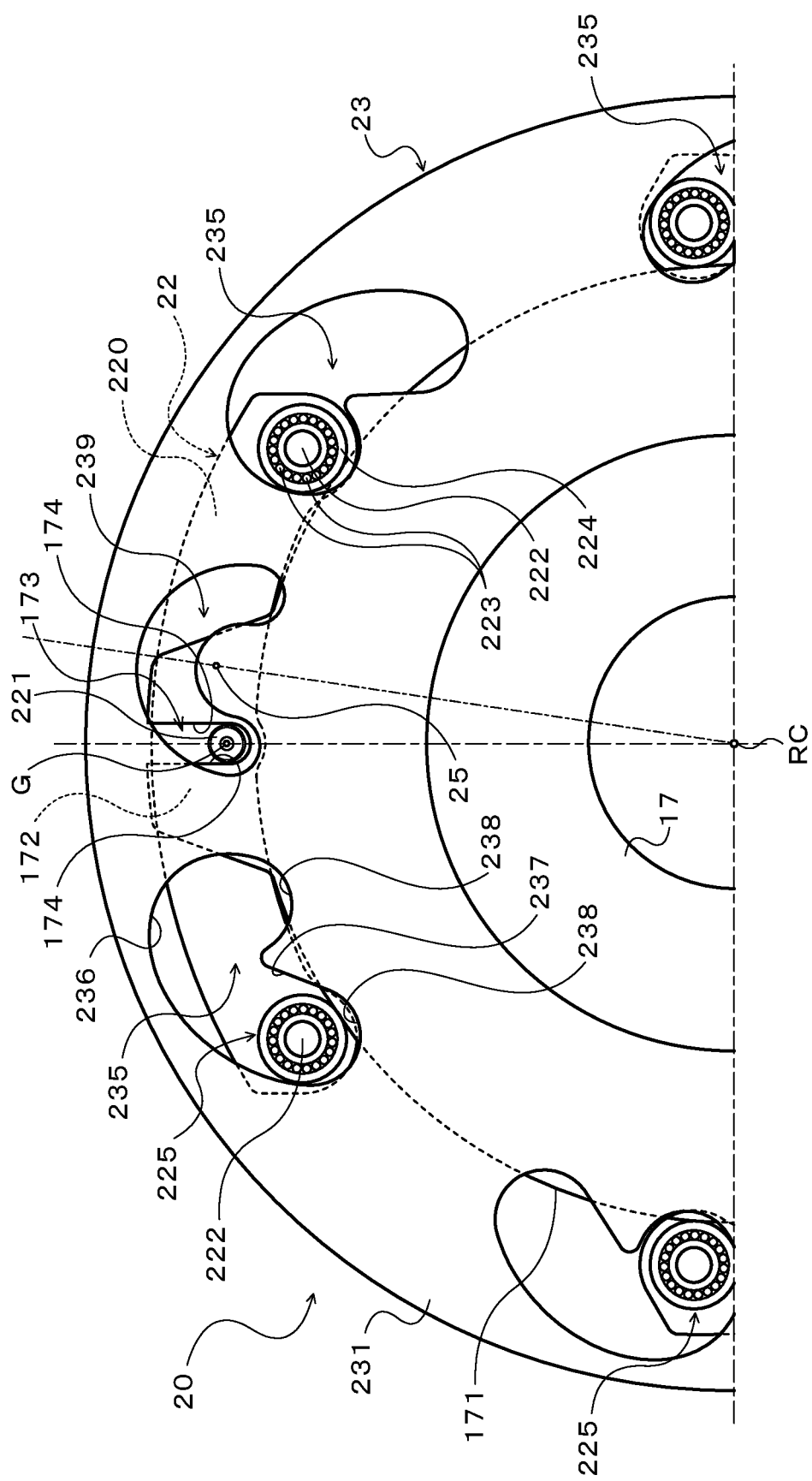
FIG. 7 is an enlarged view illustrating the vibration damping device according to the present disclosure.

Accordingly, as illustrated in FIG. 7, when the second and third driven plates 17 and 18 rotate in one direction (for example, counterclockwise direction in FIG. 7) about the center of rotation RC, each weight body 22 (center of gravity G) is guided by two (a pair of) guided portions 225 (outer rings 224 and second coupling shafts 222) and two (a pair of) guide portions 235 so as to approach the center of rotation RC in the radial direction of the second and third driven plates 17 and 18, with its rotation restricted. Further, when the guided portions 225 are guided by the guide portions 235, the center of gravity G of each weight body 22 rotates about the virtual axis 25 while maintaining the interaxial distance L1 constant. Thus, the inertial mass body 23 relatively rotates in the opposite direction about the center of rotation RC, with respect to the second and third driven plates 17 and 18.

A component force of the centrifugal force that acts on the center of gravity G of each weight body 22 is transmitted to the inertial mass body 23 via the guided portions 225 (outer rings 224) and the guide surfaces 236 of the guide portions 235, and serves as a restoring force that acts to return the inertial mass body 23 to the position of the equilibrium state. The restoring force overcomes a force (moment of inertia) that acts to rotate the inertial mass body 23 in the same rotational direction as before, at an end of the swing range of the weight body 22 determined in accordance with the amplitude (vibration level) of vibration transmitted from the engine EG to the second and third driven plates 17 and 18 (driven member 15). Thus, each weight body 22 is guided by the pair of guided portions 225 and the pair of guide portions 235 so as to move in the opposite direction as before to move away from the center of rotation RC in the radial direction of the second and third driven plates 17 and 18, with its rotation restricted. Further, the inertial mass body 23 rotates in the opposite direction as before about the center of rotation RC toward the position of the equilibrium state, in conjunction with each weight body 22, due to the action of the restoring force from each weight body 22, that is, the component force of the centrifugal force.

When the inertial mass body 23 reaches the position of the equilibrium state while the second and third driven plates 17 and 18 are rotating in the one direction, the inertial mass body 23 attempts to rotate further in the same direction due to the moment of inertia (resistance to stop). Each outer ring 224 of the weight body 22 receives a force due to the moment of inertia (resistance to stop) of the inertial mass body 23 to roll on the guide surface 236 toward the other end of the guide portion 235. Thus, each weight body 22 (center of gravity G) is guided by the pair of guided portions 225 and the pair of guide portions 235 so as to approach again the center of rotation RC in the radial direction of the second and third driven plates 17 and 18, with its rotation restricted. Further, when the guided portions 225 are guided by the guide portions 235, the center of gravity G of each weight body 22 rotates about the virtual axis 25 while maintaining the interaxial distance L1 constant. Thus, the inertial mass body 23 relatively rotates in the same direction about the center of rotation RC, with respect to the second and third driven plates 17 and 18.

In this case as well, a component force of the centrifugal force that acts on the center of gravity G of each weight body 22 is transmitted to the inertial mass body 23 via the guided portions 225 and the guide surfaces 236 of the guide portions 235 as the restoring force, and the restoring force overcomes a force (moment of inertia) that acts to rotate the inertial mass body 23 in the same rotational direction as before, at an end of the swing range. Thus, each weight body 22 is guided by the pair of guided portions 225 and the pair of guide portions 235 so as to move away from the center of rotation RC in the radial direction of the second and third driven plates 17 and 18, with its rotation restricted. Further, the inertial mass body 23 rotates about the center of rotation RC toward the position of the equilibrium state, in conjunction with each weight body 22, due to the action of the restoring force from each weight body 22, that is, the component force of the centrifugal force.

As described above, when the second and third driven plates 17 and 18 (driven member 15) rotate in one direction, each weight body 22 serving as a restoring force generation member of the vibration damping device 20 swings (reciprocally moves) with respect to the center of rotation RC in the radial direction of the second and third driven plates 17 and 18 within the swing range centered at the position of the equilibrium state determined in accordance with the amplitude (vibration level) of vibration transmitted from the engine EG to the driven member 15. Further, a component force of the centrifugal force that acts on each weight body 22 is transmitted to the inertial mass body 23 via the guided portions 225 and the guide portions 235 as a restoring force, so that the inertial mass body 23 swings (reciprocally rotates) in the direction opposite to the second and third driven plates 17 and 18 about the center of rotation RC within the swing range centered at the position of the equilibrium state determined in accordance with swing range of each weight body 22.

Accordingly, torque (inertia torque) with a phase opposite to that of fluctuating torque (vibration) transmitted from the engine EG to the drive member 11 inertia torque can be transmitted from the swinging inertial mass body 23 to the second and third driven plates 17 and 18 via the guide portions 235, the guided portions 225, each weight body 22, the first coupling shaft 221, and the projecting portions 172 and 182. As a result, by determining the specifications of the vibration damping device 20 such that the vibration damping device 20 has an order that matches the order (excitation order: 1.5th order in the case where the engine EG is a three-cylinder engine, and second order in the case where the engine EG is a four-cylinder engine) of vibration transmitted from the engine EG to the second and third driven plates 17 and 18, vibration transmitted from the engine EG to the driven member 15 (second and third driven plates 17 and 18) can be appropriately damped by the vibration damping device 20 regardless of the rotational speed of the engine EG (the second and third driven plates 17 and 18).

Further, in the vibration damping device 20, the plate members 220 of each weight body 22 and the inertial mass body 23 are offset in the axial direction of the second and third driven plates 17 and 18 serving as a support member, and each of the second and third driven plates 17 and 18 (projecting portions 172 and 182) is disposed between a corresponding one of the plate members 220 of each weight body 22 and the inertial mass body 23 in the axial direction. Accordingly, when the driven member 15 serving as a rotary element rotates, the weight bodies 22 and the inertial mass body 23 do not slidingly contact each other, so that the sliding resistance between the weight bodies 22 and the inertial mass body 23 does not affect the vibration damping performance of the vibration damping device 20. Meanwhile, in the vibration damping device 20, when the driven member 15, that is, the second and third driven plates 17 and 18 rotate, the weight bodies 22 (projections 220$p$) slidingly contact the second and third driven plates 17 and 18, and the inertial mass body 23 slidingly contacts the second and third driven plates 17 and 18 (projections 17$p$ and 18$p$). However, a study and analysis by the inventors found that the sliding resistance between the weight bodies 22 and the second and third driven plates 17 and 18 and the sliding resistance between the inertial mass body 23 and the second and third driven plates 17 and 18 do not greatly affect the vibration damping performance of the vibration damping device 20, compared to the sliding resistance between the weight bodies 22 and the inertial mass body 23. Accordingly, by arranging each of the second and third driven plates 17 and 18 between the corresponding plate member 220 of each weight body 22 and the inertial mass body 23 in the axial direction, it is possible to further improve the vibration damping performance of the vibration damping device 20.

In the vibration damping device 20, each weight body 22 includes two plate members 220 coupled to face each other with a space therebetween in the axial direction, and the second and third driven plates 17 and 18 are arranged in the axial direction between the two plate members 220. The inertial mass body 23 (first plate member 231) is disposed between the second and third driven plates 17 and 18 in the axial direction. Thus, it is possible to sufficiently secure the weight of the weight bodies 22 and the inertial mass body 23, that is, a sufficient centrifugal force that acts on the weight bodies 22 and a sufficient moment of inertia of the inertial mass body 23, and thus to further improve the vibration damping performance, while preventing the weight bodies 22 and the inertial mass body 23 from slidingly contacting each other.

Further, in the vibration damping device 20, the inertial mass body 23 includes the first plate member 231 disposed between the second and third driven plates 17 and 18 in the axial direction, and two second plate members 232 each fixed to the first plate member 231 so as to be located between the two plate members 220 of each weight body 22 in the axial direction and to be located on the radially outer side of a corresponding one of the second and third driven plates 17 and 18. Further, as illustrated in FIGS. 4 and 6, the thickness of the second and third driven plates 17 and 18 (projecting portions 172 and 182) is greater than the thickness of the second plate members 232 of the inertial mass body 23. Accordingly, the clearance in the axial direction between each plate member 220 of each weight body 22 and the corresponding second plate member 232 of the inertial mass body 23 is greater than the clearance in the axial direction between each plate member 220 of each weight body 22 and the second or third driven plate 17 or 18 (projecting portion 172 or 182).

Accordingly, each plate member 220 of each weight body 22 and the first plate member 231 of the inertial mass body 23 can be separated from each other by the second and third driven plates 17 and 18 so as not to slidingly contact each other. Also, it is possible to sufficiently separate each plate member 220 of each weight body 22 and each second plate member 232 of the inertial mass body 23 from each other and to prevent their mutual contact. Moreover, it is possible to sufficiently secure the weight, that is, moment of inertia of the inertial mass body 23, and thus to further improve the vibration damping performance. However, depending on the axial length of the projection 220p of each plate member 220, the thickness of the second and third driven plates 17 and 18 (projecting portions 172 and 182) does not have to be greater than the thickness of the second plate members 232 of the inertial mass body 23. That is, when the axial length of the projection 220p is sufficiently large, the clearance in the axial direction between the plate member 220 and the second plate member 232 is greater than the clearance in the axial direction between the plate member 220 and the second or third driven plate 17 or 18, regardless of the thickness of the second and third driven plates 17 and 18 and the second plate member 232.

Further, in the vibration damping device 20, each weight body 22 has two (a pair of) guided portions 225 spaced apart from each other in the width direction, and the motion of each weight body 22 is regulated (restricted) by the two guided portions 225 and the pair of (two) guide portions 235 of the inertial mass body 23 corresponding thereto. Thus, it is possible to reduce a decrease in the order of the vibration damping device 20 caused by an increase in equivalent mass due to the rotation of each weight body 22 by restricting the rotation of the weight body 22 by a pair of guided portions 225 and a pair of guide portions 235, and to reduce a decrease in (the component force of) the centrifugal force that acts on the weight body 22 used as a restoring force for swinging the inertial mass body 23 by smoothly swinging the weight body 22 with respect to the second and third driven plates 17 and 18.

Moreover, since a decrease in the order due to the rotation of the weight body 22 is reduced, it is possible to sufficiently secure the weight of the inertial mass body 23 and reliably achieve the vibration damping effect. Further, since the motion of each weight body 22 is regulated (restricted) by a pair of guided portions 225 and a pair of guide portions 235, it is possible to reduce the frictional force generated between the first coupling shaft 221 and the projecting portions 172 and 182 of the second and third driven plates 17 and 18 when transmitting and receiving torque between the weight body 22 and the second and third driven plates 17 and 18. Thus, it is possible to further improve the vibration damping performance of the vibration damping device 20 including the weight bodies 22 that swing in the radial direction of the second and third driven plates 17 and 18 along with rotation of the second and third driven plates 17 and 18.

Further, in each weight body 22, the two guided portions 225 are arranged symmetrically with respect to the center line CL of the plate member 220 in the width direction, and the first coupling shaft 221 serving as a torque transmission unit is disposed on the center line CL. Thus, it is possible to swing the weight body 22 more smoothly with its rotation restricted by the pair of guide portions 235 and the pair of guided portions 225, and to appropriately reduce a decrease in the centrifugal force that acts on the weight body 22 by reducing the frictional force generated between the first coupling shaft 221 and the projecting portions 172 and 182. However, in the case where the weight body 22 is coupled to the second and third driven plates 17 and 18 so as to transmit and receive torque via the first coupling shaft 221 and the pair of inner surfaces 174 and the pair of the inner surfaces 184 of the slits 173 and 183, the rotation of the weight body 22 can be restricted by the first coupling shaft 221, the inner surfaces 174 and 184, and a set of the guided portion 225 and the guide portion 235. Accordingly, one guided portion 225 and one guide portion 235 may be provided for each weight body 22. Further, three or more guided portions 225 and three or more guide portions 235 may be provide for each weight body 22.

In the vibration damping device 20, the guided portion 225 is provided on the weight body 22, and the guide portion 235 is formed on the inertial mass body 23. Accordingly, it is possible to reduce a decrease in the centrifugal force that acts on each weight body 22, that is, the restoring force that acts on the inertial mass body 23 by locating the center of gravity G of the weight body 22 further away from the center of rotation RC, and thus to appropriately secure the vibration damping performance. However, in the vibration damping device 20, the guide portion 235 may be provided on the weight body 22, and the guided portion 225 may be formed on the inertial mass body 23.

Each guided portion 225 includes the second coupling shaft 222 supported by the weight body 22, that is, two plate members 220, and the outer ring 224 rotatably supported by the second coupling shaft 222. Each guide portion 235 includes the inwardly curved guide surface 236 on which the outer ring 224 rolls. Thus, it is possible to swing the weight body 22 much more smoothly, and thereby to extremely appropriately reduce a decrease in the centrifugal force that acts on the weight body 22.

In the vibration damping device 20, the second and third driven plates 17 and 18 include, as torque transmission surfaces that transmit torque to and receive torque from the corresponding weight body 22, the paired inner surfaces 174 extending in the radial direction and facing each other with a space therebetween in the circumferential direction of the second driven plate 17, and the paired inner surfaces 184 extending in the radial direction and facing each other with a space therebetween in the circumferential direction of the third driven plate 18. Further, each weight body 22 includes, as a torque transmission portion that transmits torque to and receives torque from the second and third driven plates 17 and 18, the first coupling shaft 221 disposed between the paired inner surfaces 174 (slit 173) and between the paired inner surfaces 184 (slit 183) of the second and third driven plates 17 and 18 so as to abut against one of the paired inner surfaces 174 and one of the paired inner surfaces 184. Accordingly, it is possible to connect the second and third driven plates 17 and 18 and each weight body 22 so as to transmit torque therebetween, and to reduce the frictional force generated at the joint therebetween, that is, between the inner surfaces 174 and 184 and the first coupling shaft 221.

However, two first coupling shafts 221 (first torque transmission portions) may be provided for each weight body 22. The two first coupling shafts 221 may be disposed with a space therebetween in the width direction (circumferential direction) of the weight body 22 (plate member 220). A projecting portion (second torque transmission portion) extending in the radial direction and disposed between the two first coupling shafts 221 may be formed on each of the second and third driven plates 17 and 18 serving as a support member. With this configuration as well, it is possible to connect the second and third driven plates 17 and 18 and each weight body 22 to transmit torque therebetween, and reduce the frictional force generated at the joint therebetween, that is, between the projecting portions and the first coupling shaft 221.

Further, in the vibration damping device 20, as illustrated in FIG. 5, the center of curvature of the cylindrical surface CSi defined by a curved surface in contact with the projecting portions 220a and 220b formed on the inner peripheral surface of the plate member 220 of each weight body 22 coincides with the center of rotation RC when the weight body 22 is located in the radially innermost position (see the solid line in FIG. 5) in the swing range. Thus, it is possible to appropriately reduce interference between each weight body 22 that swings and a member disposed on the radially inner side of the weight body 22, and to appropriately secure the weight of the weight body 22 by attracting the inner peripheral surface of the weight body 22 toward the center of rotation RC. However, the inner peripheral surface of each plate member 220 of each weight body 22 may be formed in inwardly curved cylindrical shape. In this case, the center of curvature of the inner peripheral surface of the plate member 220 may coincide with the center of rotation RC when the weight body 22 is located in the radially innermost position in the swing range. Further, as illustrated in FIG. 5, the center of curvature of the outer peripheral surface, that is, the cylindrical surface CSo of each plate member 220 of each weight body 22 coincides with the center of rotation RC when the weight body 22 is located in the radially outermost position (see the dashed line in FIG. 5) in the swing range. Thus, it is possible to secure a sufficient swing range of each weight body 22.

Figure 8:
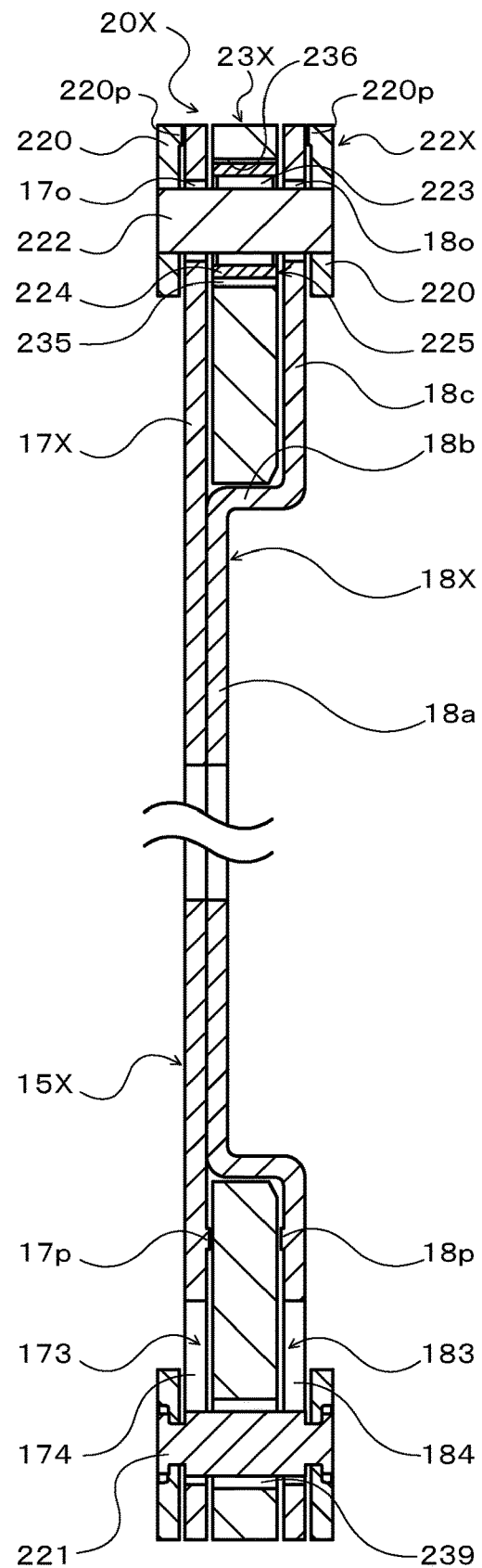
FIG. 8 is a cross-sectional view illustrating another vibration damping device according to the present disclosure.

FIG. 8 is a cross-sectional view illustrating another vibration damping device 20X according to the present disclosure. Elements of the vibration damping device 20X that are the same as elements of the above-described vibration damping device 20 are denoted by the same reference numerals, and a description thereof will not be repeated.

An inertial mass body 23X of the vibration damping device 20X illustrated in FIG. 8 corresponds to the inertial mass body 23 without the two second plate members 232, and is an annular member including a plurality of guide portions 235 disposed in pairs at intervals in the circumferential direction, and openings 239. Second and third driven plates 17X and 18X of a driven member 15X of the vibration damping device 20X are annular members having the substantially same outside diameter as the inertial mass body 23X. In the example of FIG. 8, the radius of curvature of the outer peripheral surfaces of the second and third driven plates 17X and 18X is equal to the radius of curvature of the outer peripheral surface of the inertial mass body 23X. Further, the second driven plate 17X includes a plurality of openings 17o formed at intervals in the circumferential direction in its outer peripheral portion such that its inner surface does not contact the corresponding second coupling shafts 222, and a plurality of slits 173 formed at intervals in the circumferential direction in its outer peripheral portion so as to extend in the radial direction of the second driven plate 17X. Similarly, the third driven plate 18X includes a plurality of openings 18o formed at intervals in the circumferential direction in its outer peripheral portion such that its inner surface does not contact the corresponding second coupling shafts 222, and a plurality of slits 183 formed at intervals in the circumferential direction in the outer peripheral portion of an annular portion 18c so as to extend in the radial direction of the third driven plate 18X.

As illustrated in FIG. 8, in the vibration damping device 20X as well, plate members 220 of each weight body 22X and the inertial mass body 23X are offset in the axial direction of the second and third driven plates 17X and 18X serving as a support member, and each of the second and third driven plates 17X and 18X is disposed between a corresponding one of the plate members 220 of each weight body 22X and the inertial mass body 23X in the axial direction. That is, the outer peripheral portion of the second driven plate 17X is disposed between one of the plate members 220 of each weight body 22X and the inertial mass body 23X in the axial direction, and the annular portion 18c of the third driven plate 18X is disposed between the other one of the plate members 220 of each weight body 22X and the inertial mass body 23X in the axial direction. The vibration damping device 20X can achieve the same advantageous effects as those achieved by the vibration damping device 20 described above.

Figure 9:
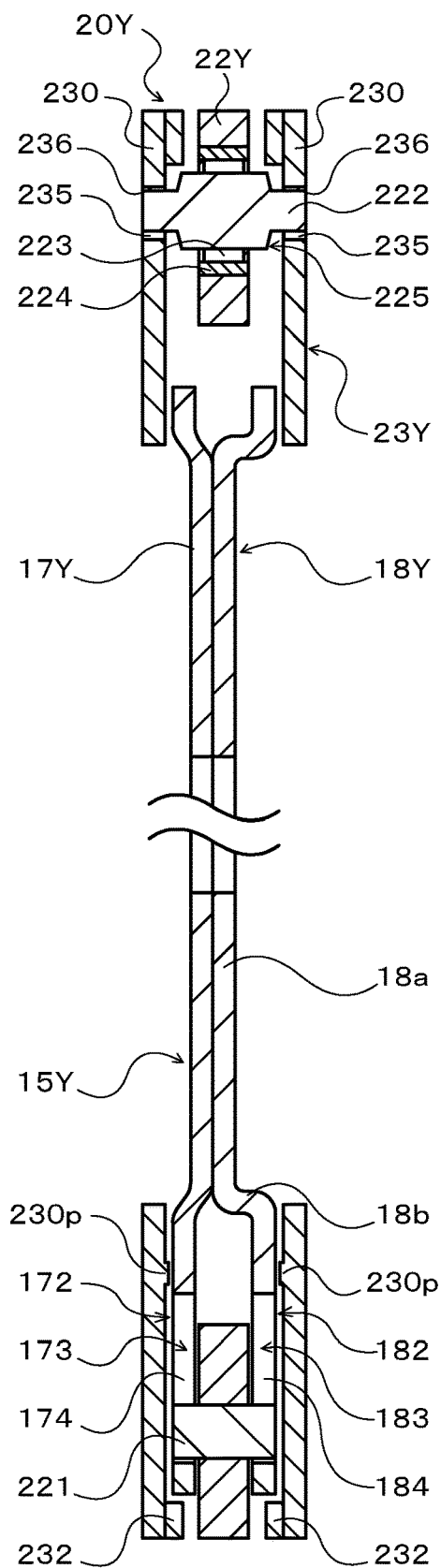
FIG. 9 is a cross-sectional view illustrating still another vibration damping device according to the present disclosure.

FIG. 9 is a cross-sectional view illustrating still another vibration damping device 20Y according to the present disclosure. Elements of the vibration damping device 20Y that are the same as elements of the above-described vibra- A second driven plate 17Y of a driven member 15Y of the vibration damping device 20Y illustrated in FIG. 9 has a plurality of projecting portions 172 formed at intervals (equal intervals) in the circumferential direction to project radially outward from its outer peripheral surface, and slits 173 formed in the respective projecting portions 172. Similarly, a third driven plate 18Y of the driven member 15Y has a plurality of projecting portions 182 formed at intervals (equal intervals) in the circumferential direction to project radially outward from its outer peripheral surface, and slits 183 formed in the respective projecting portions 182.

Each weight body 22Y of the vibration damping device 20Y is a metal plate member having a symmetric arc planar shape, and a first coupling shaft 221 is fixed to the weight body 22Y so as to extend out from both sides. The first coupling shaft 221 is formed in the shape of a solid (or hollow) round rod, and the axis of the first coupling shaft 221 passes through the center of gravity of the weight body 22Y on the center line of the weight body 22Y in the width direction (circumferential direction) thereof. In the example of FIG. 9, the axial length of the first coupling shaft 221 is equal to or less than the distance between the outer surface of a projecting portion 172 and the outer surface of a projecting portion 182 of the second and third driven plates 17Y and 18Y fixed to each other. Further, two cylindrical outer rings 224 are fixed to the weight body 22Y so as not to be rotatable. The two outer rings 224 are respectively fixed to a first end and a second end of each weight body 22Y so as to be located symmetrically with respect to the center line of the weight body 22Y passing through the center of gravity. Further, each outer ring 224 rotatably supports the corresponding second coupling shaft 222 via a plurality of rollers (rolling bodies) 223 such that the second coupling shaft 222 extends out from both sides of the weight body 22Y.

The inertial mass body 23Y of the vibration damping device 20Y includes two plate members 230, and two second plate members 232 each fixed to a corresponding one of the two plate members 230. Each plate member 230 includes a plurality of guide portions 235 disposed in pairs at intervals in the circumferential direction. Further, the inner peripheral surface of each second plate member 232 is formed so as to be located on the radially outer side of the inner peripheral surface of each plate member 230 when the second plate member 232 is disposed coaxially with the plate member 230. Further, as illustrated in FIG. 9, the thickness of each second plate member 232 is less than the thickness of the second and third driven plates 17Y and 18Y (projecting portions 172 and 182).

As illustrated in FIG. 9, each weight body 22Y is disposed between the second and third driven plates 17Y and 18Y in the axial direction. Further, one end of the first coupling shaft 221 of each weight body 22Y is slidably disposed in the slit 173 in the corresponding projecting portion 172 of the second driven plate 17 so as to abut against one of the paired inner surfaces 174. Further, the other end of the first coupling shaft 221 is slidably disposed in the slit 183 in the corresponding projecting portion 182 of the third driven plate 18 so as to abut against one of the paired inner surfaces 184. The second and third driven plates 17Y and 18Y (projecting portions 172 and 182) are arranged in the axial direction between the two plate members 230 of the inertial mass body 23Y. Further, each second plate member 232 of the inertial mass body 23 is fixed to the inner surface (surface facing the weight body 22Y) of the corresponding plate member 230 via a fixing member (not illustrated) so as to be located on the radially outer side of the corresponding second and third driven plates 17 and 18 (projecting portions 172 and 182). As illustrated in FIG. 9, at least one projection 230p is formed on the inner surface of each plate member 230 of the inertial mass body 23Y. The projection 230p abuts against the surface of the projecting portion 172 of the second driven plate 17 or the surface of the projecting portion 182 of the third driven plate 18 to restrict movement of the plate member 230 with respect to the second driven plate 17Y or the third driven plate 18Y in the axial direction.

The vibration damping device 20Y can achieve the same advantageous effects as those achieved by the vibration damping device 20 described above. In the vibration damping device 20Y, each weight body 22Y is disposed between the second and third driven plates 17Y and 18Y in the axial direction and between the two second plate members 232 of the inertial mass body 23Y in the axial direction. The thickness of the second and third driven plates 17Y and 18Y (projecting portions 172 and 182) is greater than the thickness of the second plate members 232. Accordingly, the clearance in the axial direction between each second plate member 232 of the inertial mass body 23Y and each weight body 22Y is greater than the clearance between each plate member 230 of the inertial mass body 23Y and the second or third driven plate 17Y or 18Y (projecting portion 172 or 182) in the axial direction.

Accordingly, each weight body 22Y and each plate member 230 of the inertial mass body 23Y can be separated from each other by the second and third driven plates 17Y and 18Y so as not to slidingly contact each other. Also, it is possible to sufficiently separate each weight body 22Y and each second plate member 232 of the inertial mass body 23 from each other and to prevent their mutual contact. Moreover, in the vibration damping device 20Y, it is possible to sufficiently secure the weight, that is, moment of inertia of the inertial mass body 23Y, and thus to further improve the vibration damping performance. However, depending on the axial length of the projection 230p of each plate member 230, the thickness of the second and third driven plates 17Y and 18Y (projecting portions 172 and 182) does not have to be greater than the thickness of the second plate members 232 of the inertial mass body 23Y. That is, when the axial length of the projection 230p of each plate member 230 is sufficiently large, the clearance in the axial direction between the second plate member 232 and each weight body 22Y is greater than the clearance in the axial direction between the plate member 230 and the second or third driven plate 17 or 18, regardless of the thickness of the second and third driven plates 17Y and 18Y and the second plate member 232.

In the vibration damping device 20, 20X, 20Y described above, the center of gravity G of each weight body 22 swings about the virtual axis 25 while maintaining the interaxial distance L1 constant. However, the present disclosure is not limited thereto. That is, the vibration damping device 20, 20X, 20Y may be configured such that a part other than the center of gravity of the weight body 22 swings about the virtual axis 25 while maintaining the interaxial distance constant. Further, in the vibration damping device 20, 20X, 20Y, the guide portions 235 that guide the guided portions 225 may be formed such that the weight body 22 and so on move in an arc trajectory when swinging with respect to the center of rotation RC in the radial direction of the second and third driven plates 17 and 18 and so on. Further, each of the support member, the weight bodies, and the inertial mass body in the vibration damping device 20, 20X, 20Y may be formed of a single plate member. In this case, each weight body and the inertial mass body may be offset in the axial direction of the support member, and the support member may be disposed between each weight body and the inertial mass body in the axial direction.

Figure 10:
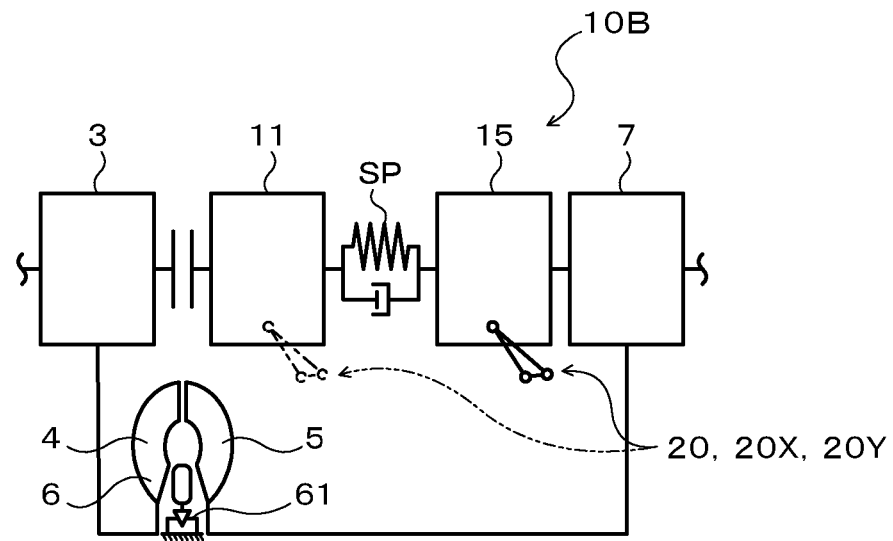
FIG. 10 is a schematic configuration diagram illustrating a modification of a damper device including the vibration damping device according to the present disclosure.

The vibration damping device 20, 20X, 20Y may be coupled to the intermediate member 12 of the damper device 10, or may be coupled to the drive member (input element) 11 (see the double-dot chain line in FIG. 1). Further, the vibration damping device 20, 20X, 20Y may be applied to a damper device 10B illustrated in FIG. 10. The damper device 10B of FIG. 10 corresponds to the damper device 10 without the intermediate member 12, and includes a drive member (input element) 11 and a driven member 15 (output element) as rotary elements, and also includes springs SP disposed between the drive member 11 and the driven member 15 as a torque transmission element. In this case, the vibration damping device 20, 20X, 20Y may be coupled to the driven member 15 of the damper device 10B as illustrated in FIG. 10, or may be coupled to the drive member 11 as indicated by the two-dot chain line in FIG. 10.

Figure 11:
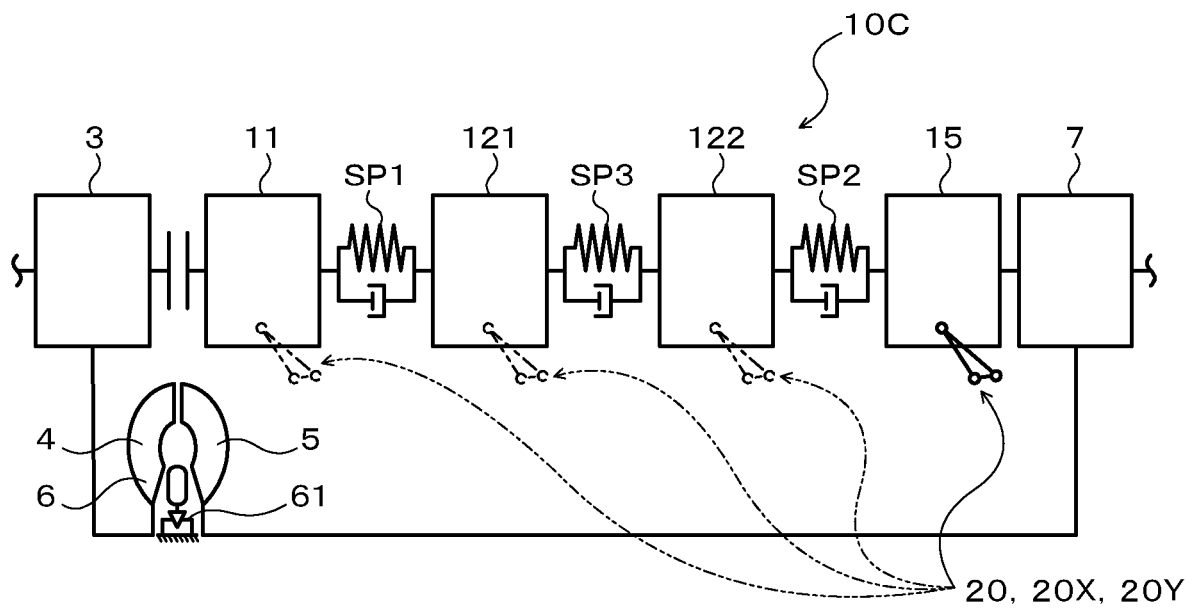
FIG. 11 is a schematic configuration diagram illustrating another modification of the damper device including the vibration damping device according to the present disclosure.

Further, the vibration damping device 20, 20X, 20Y may be applied to a damper device 10C illustrated in FIG. 11. The damper device 10C of FIG. 11 includes a drive member (input element) 11, a first intermediate member (first intermediate element) 121, a second intermediate member (second intermediate element) 122, and a driven member (output element) 15 as rotary elements, and also includes first springs SP1 disposed between the drive member 11 and the first intermediate member 121, second springs SP2 disposed between the second intermediate member 122 and the driven member 15, and third springs SP3 disposed between the first intermediate member 121 and the second intermediate member 122 as torque transmission elements. In this case, the vibration damping device 20, 20X, 20Y may be coupled to the driven member 15 of the damper device 10C as illustrated in FIG. 11, or may be coupled to the first intermediate member 121, the second intermediate member 122, or the drive member 11 as indicated by the two-dot chain line in FIG. 11. In any case, by coupling the vibration damping device 20, 20X, 20Y to a rotary element of the damper device 10, 10B, 10C, it is possible to extremely appropriately damp vibration using both the damper device 10 to 10C and the vibration damping device 20, 20X, 20Y.

As described above, a vibration damping device (20, 20X, 20Y) according to the present disclosure includes: a support member (17, 17X, 17Y, 18, 18X, 18Y) that rotates, together with a rotary element (11, 12, 121, 122, 15) to which torque from an engine (EG) is transmitted, about a center of rotation (RC) of the rotary element (11, 12, 121, 122, 15); a restoring force generation member (22, 22X, 22Y) that is coupled to the support member (17, 17X, 17Y, 18, 18X, 18Y) to transmit torque to and receive torque from the support member (17, 17X, 17Y, 18, 18X, 18Y) and that is swingable along with rotation of the support member (17, 17X, 17Y, 18, 18X, 18Y); and an inertial mass body (23, 23X, 23Y) that is coupled to the support member (17, 17X, 17Y, 18, 18X, 18Y) via the restoring force generation member (22, 22X, 22Y) and that swings about the center of rotation (RC) in conjunction with the restoring force generation member (22, 22X, 22Y) along with rotation of the support member (17, 17X, 17Y, 18, 18X, 18Y); wherein the support member (17, 17X, 17Y, 18, 18X, 18Y) is disposed between at least a part of the restoring force generation member (22, 22X, 22Y) and at least a part of the inertial mass body (23, 23X, 23Y) in an axial direction of the rotary element.

In the vibration damping device of the present disclosure, the support member that rotates together with the rotary element is disposed between at least a part of the restoring force generation member and at least a part of the inertial mass body in an axial direction of the rotary element. Accordingly, when the rotary element and the support member rotate, the restoring force generation member and the inertial mass body do not slidingly contact each other, so that the sliding resistance between the restoring force generation member and the inertial mass body does not affect the vibration damping performance of the vibration damping device. In the vibration damping device of the present disclosure, when the rotary element and the support member rotate, the restoring force generation member and the inertial mass body slidingly contact the support member. However, a study and analysis by the inventors found that the sliding resistance between the restoring force generation member and the support member and the sliding resistance between the inertial mass body and the support member do not greatly affect the vibration damping performance of the vibration damping device, compared to the sliding resistance between the restoring force generation member and the inertial mass body. Accordingly, by arranging the support member between at least a part of the restoring force generation member and at least a part of the inertial mass body in the axial direction, it is possible to further improve the vibration damping performance of the vibration damping device including the restoring force generation member that swings along with rotation of the support member, and the inertial mass body that swings in conjunction with the restoring force generation member.

Further, one of the restoring force generation member (22, 22X, 22Y) and the inertial mass body (23, 23X, 23Y) may include two plate members (220, 230) coupled to face each other with a space therebetween in the axial direction; the support member may include two support plates (17, 17X, 17Y, 18, 18X, 18Y) arranged in the axial direction between the two plate members (220, 230); and another of the restoring force generation member (22, 22X, 22Y) and the inertial mass body (23, 23X, 23Y) may be disposed between the two support plates (17, 17X, 17Y, 18, 18X, 18Y) in the axial direction. Thus, it is possible to sufficiently secure the weight of the restoring force generation member and the inertial mass body, and thus to further improve the vibration damping performance, while preventing the restoring force generation member and the inertial mass body from slidingly contacting each other.

Further, the restoring force generation member (22X) may include the two plate members (220), and the inertial mass body (23X) may be disposed between the two support plates (17X, 18X) in the axial direction.

Further, the restoring force generation member (22) may include the two plate members (220); the inertial mass body (23) may include a first plate member (231) disposed between the two support plates (17, 18) in the axial direction, and two second plate members (232), each of the second plate members being fixed to the first plate member (231) so as to be disposed between the two plate members (220) in the axial direction and to be located on a radially outer side of a corresponding one of the two support plates (17, 18); and a clearance in the axial direction between each of the plate members (220) of the restoring force generation member (22) and a corresponding one of the second plate members (232) of the inertial mass body (23) may be greater than a clearance in the axial direction between each of the plate members (220) of the restoring force generation member (22) and a corresponding one of the support plates (17, 18). Accordingly, each plate member of the restoring force generation member and the first plate member of the inertial mass body can be separated from each other by the two support plates so as not to slidingly contact each other. Also, it is possible to sufficiently separate each plate member of the restoring force generation member and each second plate member of the inertial mass body from each other and to prevent their mutual contact. Moreover, it is possible to sufficiently secure the weight of the inertial mass body, and thus to further improve the vibration damping performance.

Further, the first plate member (231) of the inertial mass body (23) may be an annular member, and each of the second plate members (232) of the inertial mass body (23) may be an annular member having an inner peripheral surface formed to be located on a radially outer side of an inner peripheral surface of the first plate member (231).

Further, the inertial mass body (23Y) may include the two plate members (230), and two second plate members (232) each fixed to a corresponding one of the two plate members (230) so as to be located on a radially outer side of a corresponding one of the two support plates (17Y, 18Y); the restoring force generation member (22Y) may be disposed between the two support plates (17Y, 18Y) in the axial direction and between the two second plate members (230) in the axial direction; and a clearance in the axial direction between each of the second plate members (232) of the inertial mass body (23Y) and the restoring force generation member (22Y) may be greater than a clearance in the axial direction between each of the plate members (230) of the inertial mass body (23Y) and a corresponding one of the support plates (17Y, 18Y). Accordingly, the restoring force generation member and each plate member of the inertial mass body can be separated from each other by the two support plates so as not to slidingly contact each other. Also, it is possible to sufficiently separate the restoring force generation member and each second plate member of the inertial mass body from each other and to prevent their mutual contact. Moreover, it is possible to sufficiently secure the weight of the inertial mass body, and thus to further improve the vibration damping performance.

Further, each of the plate members (230) of the inertial mass body (23Y) may be an annular member, and each of the second plate members (232) of the inertial mass body (23Y) may be an annular member having an inner peripheral surface formed to be located on a radially outer side of an inner peripheral surface of each of the plate members (230).

Further, when the support member (17, 17X, 17Y, 18, 18X, 18Y) rotates, the restoring force generation member (22, 22X, 22Y) may swing with respect to the center of rotation (RC) in a radial direction of the support member (17, 17X, 17Y, 18, 18X, 18Y) without relatively moving about the center of rotation (RC) with respect to the support member (17, 17X, 17Y, 18, 18X, 18Y).

Further, the vibration damping device (20, 20X, 20Y) may further include: a guided portion (225) provided on one of the restoring force generation member (22, 22X, 22Y) and the inertial mass body (23, 23X, 23Y); and a guide portion (235) provided on another of the restoring force generation member (22, 22X, 22Y) and the inertial mass body (23, 23X, 23Y), the guide portion (235) being configured to, when the support member (17, 17X, 17Y, 18, 18X, 18Y) rotates, guide the guided portion (225) such that the restoring force generation member swings with respect to the center of rotation (RC) in a radial direction of the support member (17, 17X, 17Y, 18, 18X, 18Y), and the inertial mass body (23, 23X, 23Y) swings about the center of rotation (RC), wherein a component force of a centrifugal force that acts on the restoring force generation member (22, 22X, 22Y) is transmitted from the guided portion (225) to the guide portion (235). In this vibration damping device, the motion of the restoring force generation member coupled to the support member is regulated (restricted) by the guided portion and the guide portion formed on the restoring force generation member and the inertial mass body. Thus, it is possible to reduce a decrease in the order of the vibration damping device due to the rotation of the restoring force generation member by restricting the rotation of the restoring force generation member, and to reduce a decrease in (the component force of) the centrifugal force that acts on the restoring force generation member used as a restoring force for swinging the inertial mass body by smoothly swinging the weight body with respect to the support member. Accordingly, it is possible to further improve the vibration damping performance of the vibration damping device.

Further, the guided portion (225) may be provided on the restoring force generation member (22, 22X, 22Y), and may include a shaft (222) supported by the restoring force generation member (22, 22X, 22Y), and a roller (224) rotatably supported by the shaft (222), and the guide portion (235) may be formed on the inertial mass body (23, 23X, 23Y), and may include an inwardly curved surface (236) on which the roller (224) rolls. Thus, it is possible to swing the restoring force generation member more smoothly, and thereby to extremely appropriately reduce a decrease in the centrifugal force that acts on the restoring force generation member.

Further, the restoring force generation member (22, 22X, 22Y) may include two of the guided portions (225) spaced apart from each other in a width direction of the restoring force generation member (22, 22X, 22Y), and a torque transmission portion (221) disposed between the two guided portions (225) in the width direction to transmit torque to and receive torque from the support member (17, 17X, 17Y, 18, 18X, 18Y); and the inertial mass body (23, 23X, 23Y) may include plural of the guide portions (235) formed to correspond to the guided portions (225) of the restoring force generation member (22, 22X, 22Y). Thus, it is possible to swing the restoring force generation member more smoothly with its rotation restricted by the guide portion and the guided portion, and to appropriately reduce a decrease in the centrifugal force that acts on the restoring force generation member by further reducing the frictional force generated in the torque transmission portion when transmitting and receiving torque between the restoring force generation member and the support member.

The support member (17, 17X, 17Y, 18, 18X, 18Y) may rotate coaxially and together with one of a plurality of rotary elements of a damper device (10, 10B, 10C) that includes the plurality of rotary elements including at least an input element (11) and an output element (15), and an elastic body (SP, SP1, SP2, SP3) that transmits torque between the input element (11) and the output element (15). By coupling the vibration damping device to the rotary element of the damper device in this way, it is possible to extremely appropriately damp vibration using both the damper device and the vibration damping device.

The output element (15) of the damper device (10, 10B, 10C) may be functionally (directly or indirectly) coupled to an input shaft (IS) of a transmission (TM).

It should be understood that the various aspects of the present disclosure is not in any way limited to the embodiments described above, and various modifications may be made within the broad scope of the present disclosure. The above-described embodiments are merely specific examples of the aspects described in the summary of the disclosure, and do not limit the elements described in the summary of the disclosure.

INDUSTRIAL APPLICABILITY

The various aspects of the present disclosure are applicable to the field of vibration damping devices that damp vibration of a rotary element.

The invention claimed is:
1. A vibration damping device comprising:
a support member that rotates, together with a rotary element to which torque from an engine is transmitted, about a center of rotation of the rotary element;
a restoring force generation member that is coupled to the support member to transmit torque to and receive torque from the support member and that is swingable along with rotation of the support member; and
an inertial mass body that is coupled to the support member via the restoring force generation member and that swings about the center of rotation in conjunction with the restoring force generation member along with rotation of the support member; wherein
the support member is disposed between at least a part of the restoring force generation member and at least a part of the inertial mass body in an axial direction of the rotary element;
one of the restoring force generation member and the inertial mass body includes two plate members coupled to face each other with a space therebetween in the axial direction;
the support member includes two support plates arranged in the axial direction between the two plate members;
another of the restoring force generation member and the inertial mass body is disposed between the two support plates in the axial direction;
the restoring force generation member includes the two plate members;
the inertial mass body includes a first plate member disposed between the two support plates in the axial direction, and two second plate members, each of the second plate members being fixed to the first plate member so as to be disposed between the two plate members in the axial direction and to be located on a radially outer side of a corresponding one of the two support plates; and
a clearance in the axial direction between each of the plate members of the restoring force generation member and a corresponding one of the second plate members of the inertial mass body is greater than a clearance in the axial direction between each of the plate members of the restoring force generation member and a corresponding one of the support plates.
2. The vibration damping device according to claim 1, wherein:
the restoring force generation member includes the two plate members; and
the inertial mass body is disposed between the two support plates in the axial direction.
3. The vibration damping device according to claim 1, wherein:
the first plate member of the inertial mass body is an annular member; and
each of the second plate members of the inertial mass body is an annular member having an inner peripheral surface formed to be located on a radially outer side of an inner peripheral surface of the first plate member.
4. The vibration damping device according to claim 1, wherein when the support member rotates, the restoring force generation member swings with respect to the center of rotation in a radial direction of the support member without relatively moving about the center of rotation with respect to the support member.
5. The vibration damping device according to claim 1, further comprising:
a guided portion provided on one of the restoring force generation member and the inertial mass body; and
a guide portion provided on another of the restoring force generation member and the inertial mass body, the guide portion being configured to, when the support member rotates, guide the guided portion such that the restoring force generation member swings with respect to the center of rotation in a radial direction of the support member, and the inertial mass body swings about the center of rotation, wherein a component force of a centrifugal force that acts on the restoring force generation member is transmitted from the guided portion to the guide portion.
6. The vibration damping device according to claim 5, wherein:
the guided portion is provided on the restoring force generation member, and includes a shaft supported by the restoring force generation member, and a roller rotatably supported by the shaft; and
the guide portion is formed on the inertial mass body, and includes an inwardly curved surface on which the roller rolls.
7. The vibration damping device according to claim 6, wherein:
the restoring force generation member includes two of the guided portions spaced apart from each other in a width direction of the restoring force generation member, and a torque transmission portion disposed between the two guided portions in the width direction to transmit torque to and receive torque from the support member; and
the inertial mass body includes plural of the guide portions formed to correspond to the guided portions of the restoring force generation member.
8. The vibration damping device according to claim 1, wherein the support member rotates coaxially and together with one of a plurality of rotary elements of a damper device, the damper device including the plurality of rotary elements including at least an input element and an output element, and an elastic body that transmits torque between the input element and the output element.
9. The vibration damping device according to claim 8, wherein the output element of the damper device is functionally coupled to an input shaft of a transmission.
10. A vibration damping device comprising:
a support member that rotates, together with a rotary element to which torque from an engine is transmitted, about a center of rotation of the rotary element;
a restoring force generation member that is coupled to the support member to transmit torque to and receive torque from the support member and that is swingable along with rotation of the support member; and
an inertial mass body that is coupled to the support member via the restoring force generation member and that swings about the center of rotation in conjunction with the restoring force generation member along with rotation of the support member; wherein the support member is disposed between at least a part of the restoring force generation member and at least a part of the inertial mass body in an axial direction of the rotary element;

one of the restoring force generation member and the inertial mass body includes two plate members coupled to face each other with a space therebetween in the axial direction;

the support member includes two support plates arranged in the axial direction between the two plate members;

another of the restoring force generation member and the inertial mass body is disposed between the two support plates in the axial direction;

the inertial mass body includes the two plate members, and two second plate members each fixed to a corresponding one of the two plate members so as to be located on a radially outer side of a corresponding one of the two support plates;

the restoring force generation member is disposed between the two support plates in the axial direction and between the two second plate members in the axial direction;

a clearance in the axial direction between each of the second plate members of the inertial mass body and the restoring force generation member is greater than a clearance in the axial direction between each of the plate members of the inertial mass body and a corresponding one of the support plates.

11. The vibration damping device according to claim 10, wherein:

each of the plate members of the inertial mass body is an annular member; and each of the second plate members of the inertial mass body is an annular member having an inner peripheral surface formed to be located on a radially outer side of an inner peripheral surface of each of the plate members.

* * * * *